US011489563B2

(12) United States Patent
Nayeb Nazar et al.

(10) Patent No.: US 11,489,563 B2
(45) Date of Patent: *Nov. 1, 2022

(54) METHODS, APPARATUS, SYSTEMS AND PROCEDURES FOR UPLINK (UL) CHANNEL RECIPROCITY

(71) Applicant: IDAC Holdings, Inc., Wilmington, DE (US)

(72) Inventors: Shahrokh Nayeb Nazar, San Diego, CA (US); Afshin Haghighat, Ile-Bizard (CA); Liangping Ma, San Diego, CA (US); Erdem Bala, East Meadow, NY (US); Oghenekome Oteri, San Diego, CA (US); Moon-il Lee, Melville, NY (US); Sanjeewa Herath, Stittsville (CA)

(73) Assignee: IDAC Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/022,841

(22) Filed: Sep. 16, 2020

(65) Prior Publication Data

US 2021/0006302 A1 Jan. 7, 2021

Related U.S. Application Data

(63) Continuation of application No. 16/323,157, filed as application No. PCT/US2017/045293 on Aug. 3, 2017, now Pat. No. 10,826,573.

(Continued)

(51) Int. Cl.
*H04B 7/06* (2006.01)
*H04W 72/04* (2009.01)

(Continued)

(52) U.S. Cl.
CPC ......... *H04B 7/0417* (2013.01); *H04B 7/0452* (2013.01); *H04B 7/0486* (2013.01);
(Continued)

(58) Field of Classification Search
CPC .. H04B 7/0417; H04B 7/0639; H04B 7/0632; H04B 7/0486; H04B 7/0452; H04B 7/0617; H04W 72/082; H04W 72/042
See application file for complete search history.

(56) References Cited

U.S. PATENT DOCUMENTS 8,472,381 B1 6/2013 Lee et al.
10,826,573 B2 * 11/2020 Nayeb Nazar ....... H04B 7/0452
(Continued)

FOREIGN PATENT DOCUMENTS

CN 101394251 A 3/2009
CN 102170330 A 8/2011
(Continued)

OTHER PUBLICATIONS

Mitsubishi Electric, "Performance Evaluation of Rank-1 Precoded SRS", 3GPP Tdoc R1-100552, 3GPP TSG RAN WG1 #59bis meeting, Valencia, Spain, Jan. 18-22, 2010, 10 pages.

(Continued)

*Primary Examiner* — Mohamed A Kamara
(74) *Attorney, Agent, or Firm* — Jamie T. Nguyen

(57) ABSTRACT

Methods, apparatus and systems are disclosed. One representative method implemented by a wireless transmit/receive unit includes determining a first beamforming matrix; sending, to a network entity, an indication of the first beamforming matrix; and receiving, from the network entity, an indication of a second beamforming matrix determined by the network entity from at least the first beamforming matrix for beamforming data for transmission.

20 Claims, 14 Drawing Sheets

Related U.S. Application Data

(60) Provisional application No. 62/445,941, filed on Jan. 13, 2017, provisional application No. 62/416,476, filed on Nov. 2, 2016, provisional application No. 62/400,969, filed on Sep. 28, 2016, provisional application No. 62/373,203, filed on Aug. 10, 2016.

(51) Int. Cl.
  *H04W 72/08* (2009.01)
  *H04B 7/0417* (2017.01)
  *H04B 7/0452* (2017.01)
  *H04B 7/0456* (2017.01)

(52) U.S. Cl.
  CPC ......... *H04B 7/0632* (2013.01); *H04B 7/0639* (2013.01); *H04W 72/042* (2013.01); *H04W 72/082* (2013.01); *H04B 7/0617* (2013.01)

(56) References Cited

U.S. PATENT DOCUMENTS

| | | | |
|---|---|---|---|
| 2009/0016460 A1 | 1/2009 | Hwang et al. | |
| 2009/0046800 A1 | 2/2009 | Xu et al. | |
| 2009/0323773 A1* | 12/2009 | Bala | H04B 7/0452 |
| | | | 375/141 |
| 2010/0195748 A1 | 8/2010 | Nam et al. | |
| 2011/0002415 A1* | 1/2011 | Nakao | H04L 1/06 |
| | | | 375/296 |
| 2011/0129033 A1 | 6/2011 | Dai et al. | |
| 2011/0142144 A1 | 6/2011 | Allpress et al. | |
| 2011/0222615 A1 | 9/2011 | Kuo et al. | |
| 2012/0051453 A1 | 3/2012 | Luo et al. | |
| 2012/0170627 A1 | 7/2012 | Koike et al. | |
| 2012/0327884 A1 | 12/2012 | Seo et al. | |
| 2013/0039319 A1 | 2/2013 | Shi et al. | |
| 2013/0070723 A1* | 3/2013 | Yie | H04B 7/0641 |
| | | | 370/329 |
| 2013/0128761 A1* | 5/2013 | Kang | H04W 72/046 |
| | | | 370/252 |
| 2014/0112168 A1* | 4/2014 | Chen | H04B 7/0697 |
| | | | 370/252 |
| 2014/0307654 A1 | 10/2014 | Kim | |
| 2014/0362938 A1 | 12/2014 | Krishnamurthy et al. | |
| 2015/0381246 A1 | 12/2015 | Huang et al. | |
| 2017/0171856 A1 | 6/2017 | Zeng et al. | |
| 2017/0222707 A1 | 8/2017 | Gao et al. | |
| 2017/0264346 A1 | 9/2017 | Yue et al. | |
| 2017/0311321 A1 | 10/2017 | Kakishima et al. | |
| 2018/0287674 A1 | 10/2018 | Kloper et al. | |

FOREIGN PATENT DOCUMENTS

| | | |
|---|---|---|
| EP | 2426831 A1 | 3/2012 |
| EP | 2683093 A1 | 1/2014 |
| JP | 2013526110 A | 6/2013 |
| JP | 2013536654 A | 9/2013 |
| WO | WO 2010124588 A1 | 11/2010 |
| WO | WO 2016045535 A1 | 3/2016 |
| WO | WO 2016047409 A1 | 3/2016 |
| WO | WO 2016124060 A1 | 8/2016 |

OTHER PUBLICATIONS

Pantech, "Enhanced UL and DL transmission for CoMP", 3GPP Tdoc R1-110162, 3GPP TSG RAN1 Meeting #63bis, Dublin, Ireland, Jan. 17-21, 2011, 2 pages.
"UL MIMO framework for NR", 3GPP Tdoc R1-164016, 3GPP TSG RAN WG1 #85, Nanjing, China, May 23-27, 2016, 4 pages.
"Discussion on CSI acquisition", 3GPP Tdoc R1-164019, 3GPP TSG RAN WG1 #85, Nanjing, China, May 23-27, 2016, 4 pages.

* cited by examiner

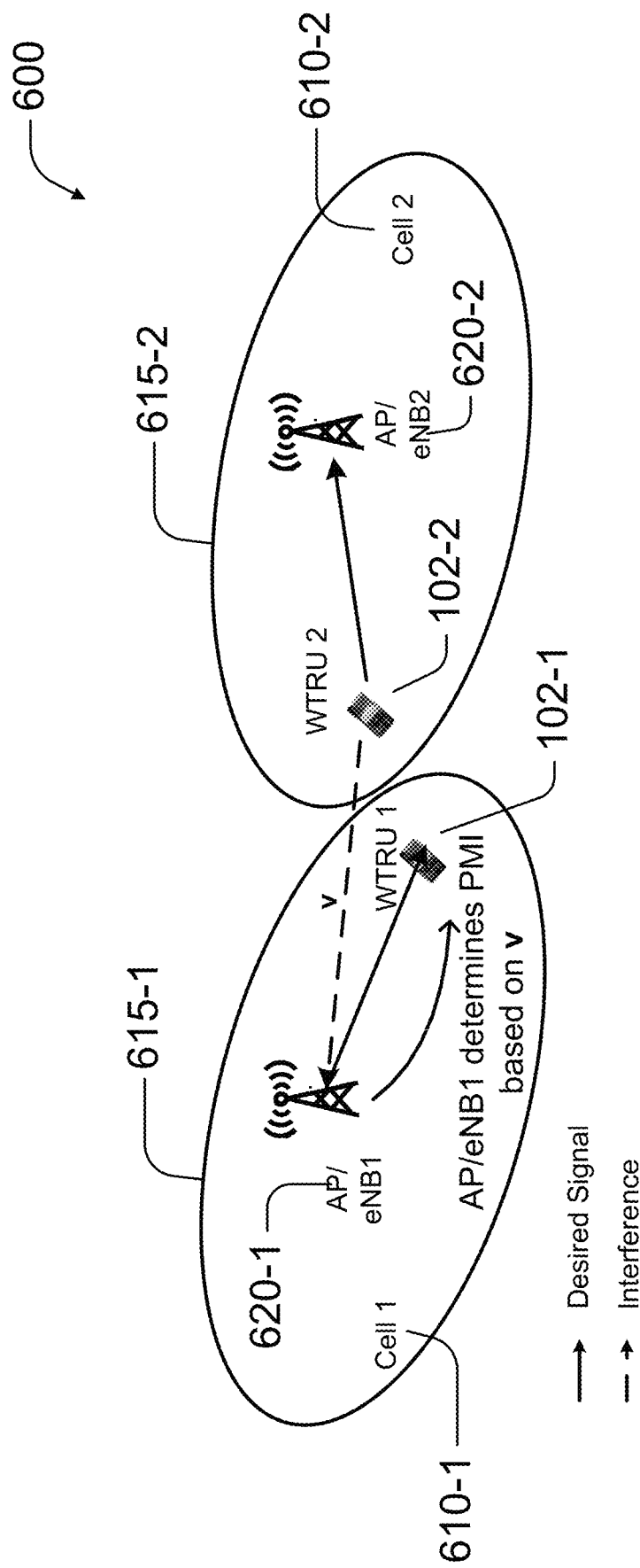
FIG. 6: Asymmetric Interference Avoidance for UL MIMO

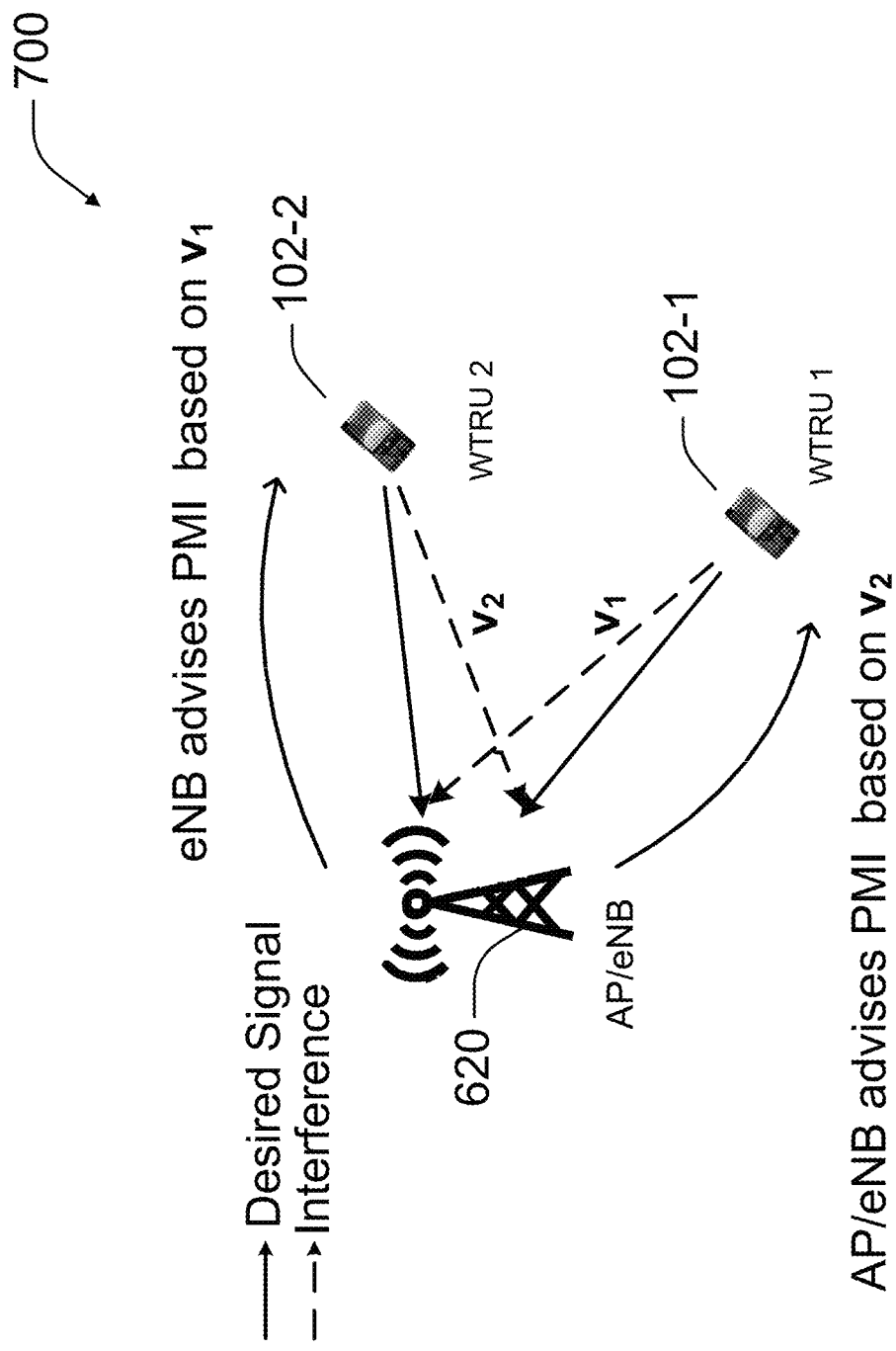
FIG. 7: Uplink MU-MIMO with single-spatial-stream transmissions based on Interference Feedback

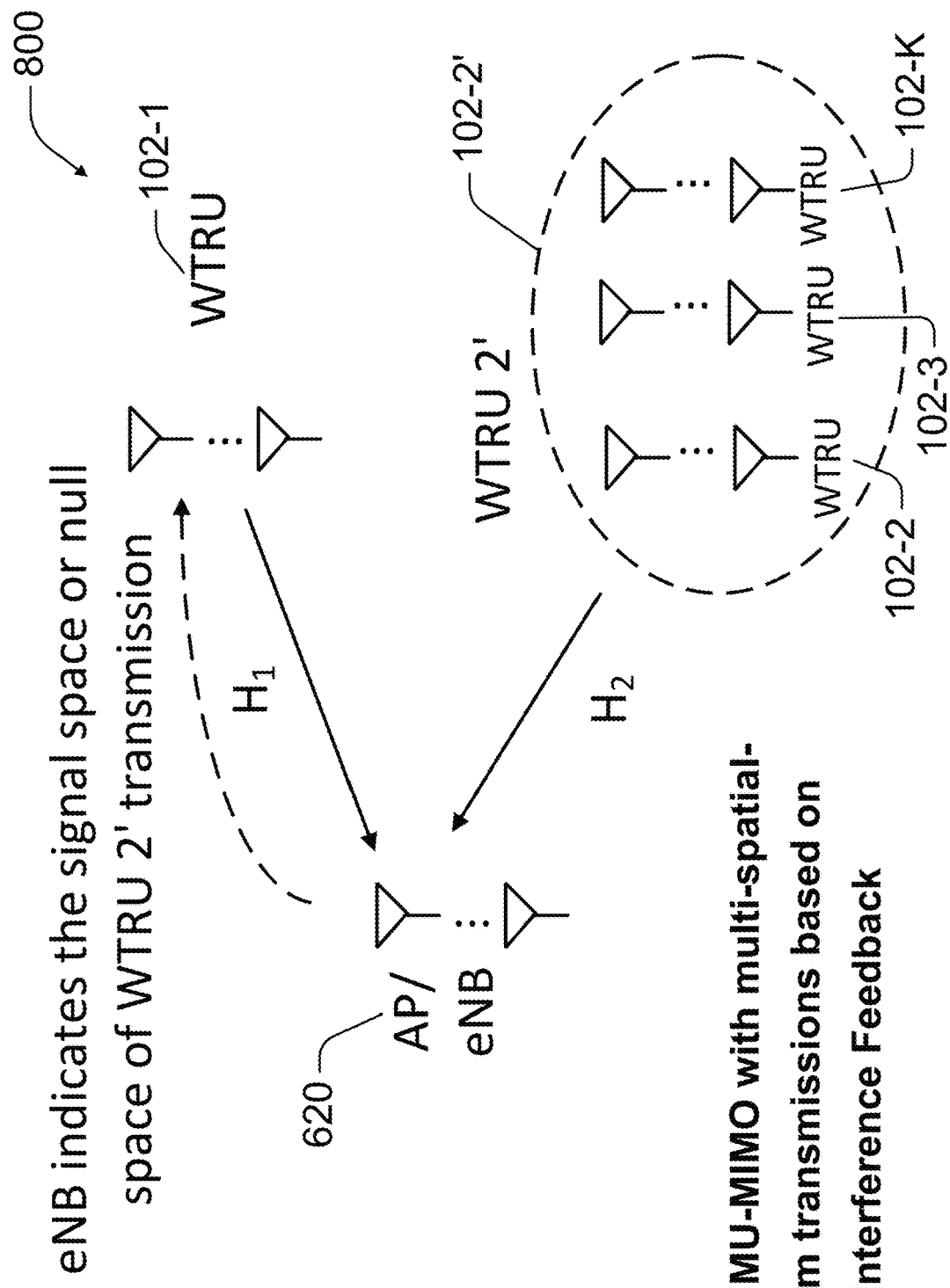
FIG. 8: Uplink MU-MIMO with multi-spatial-stream transmissions based on Interference Feedback

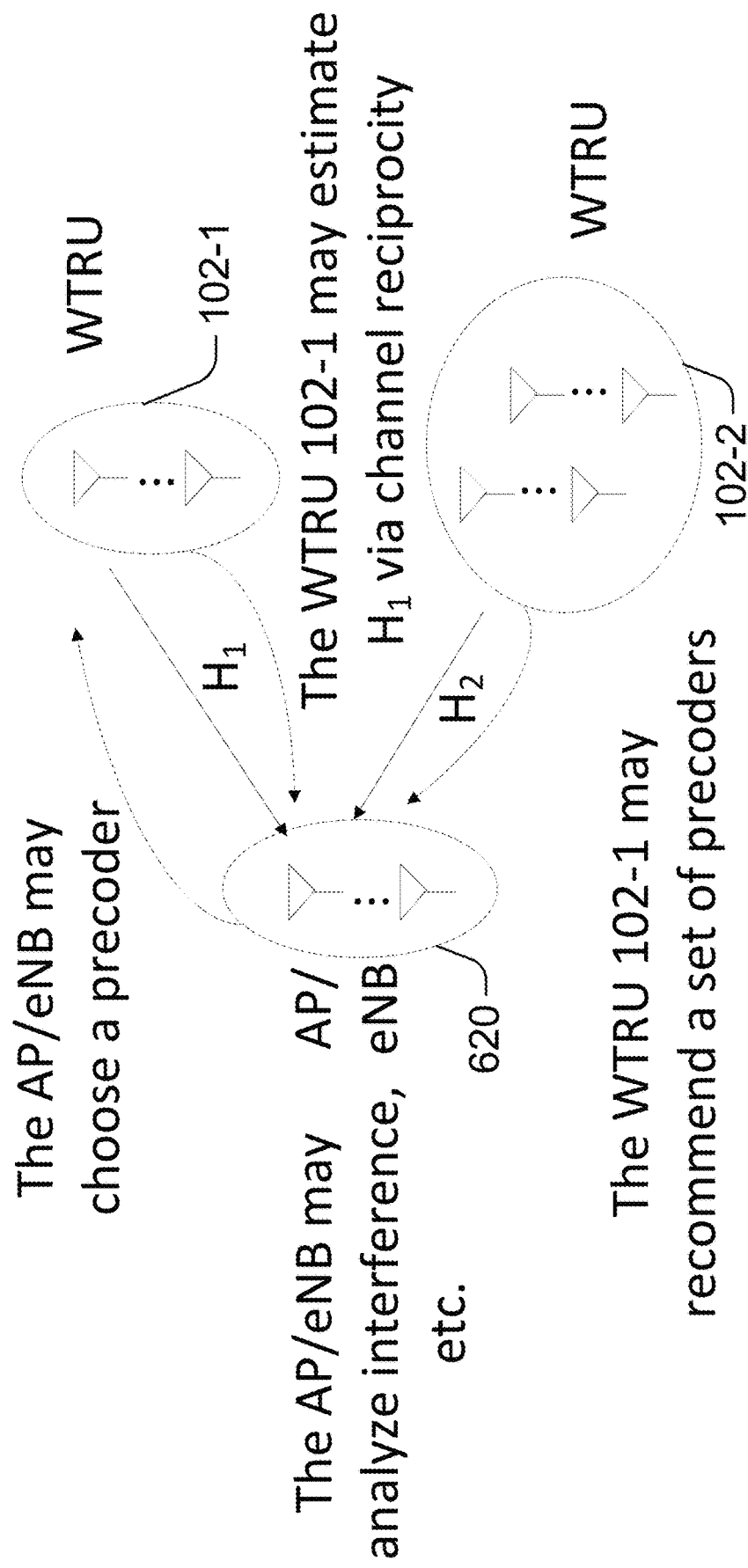
FIG. 9: WTRU Aided Interference Coordination

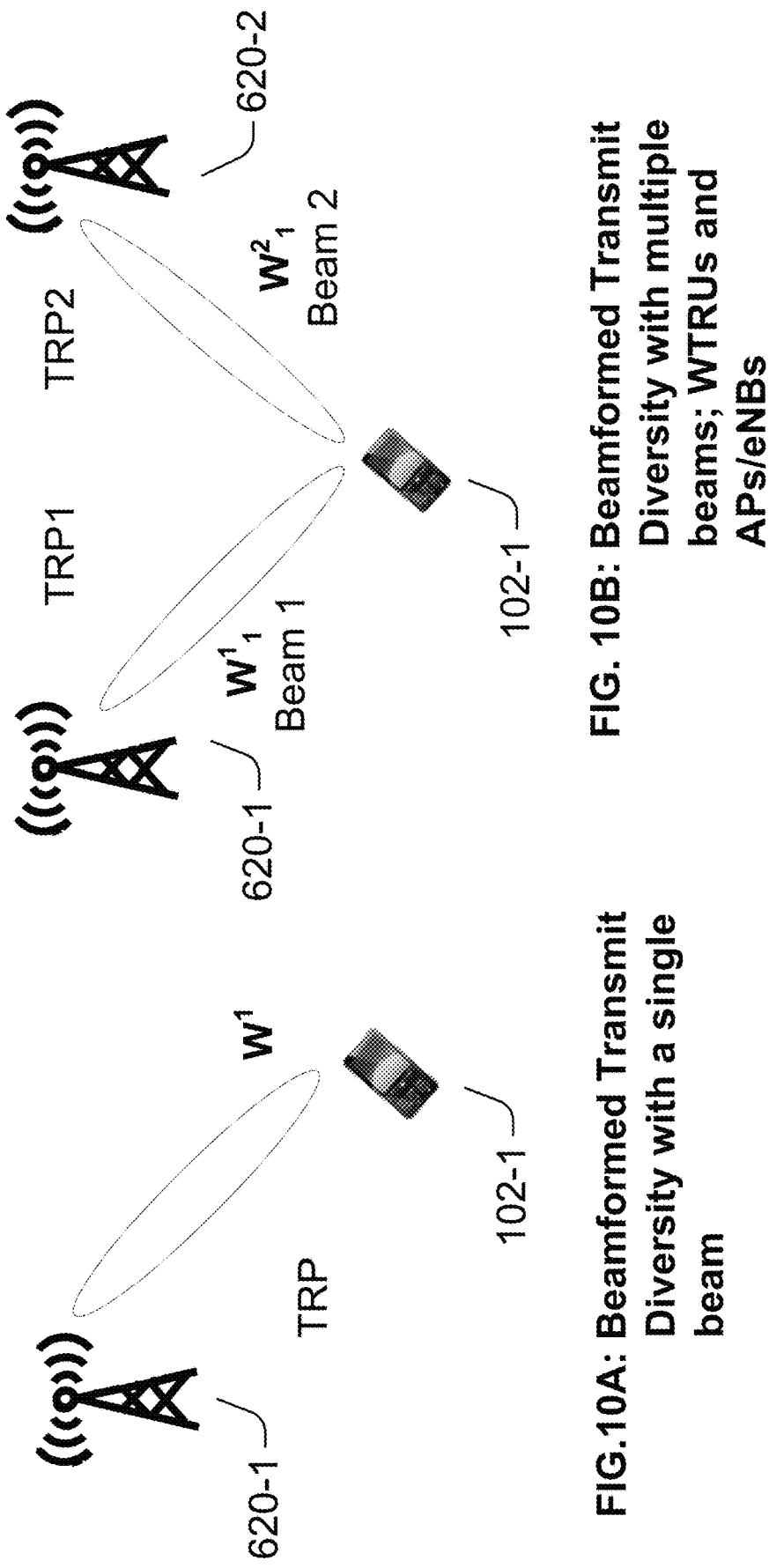
FIG. 10A: Beamformed Transmit Diversity with a single beam
FIG. 10B: Beamformed Transmit Diversity with multiple beams; WTRUs and APs/eNBs

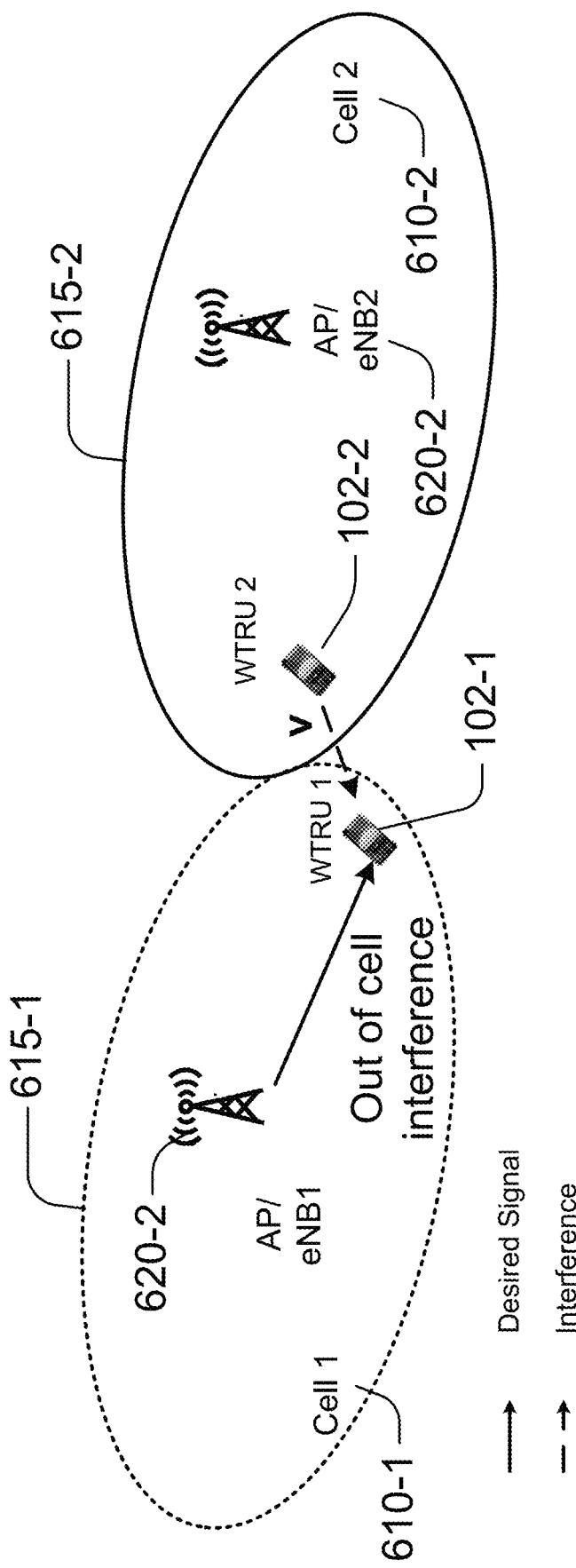
FIG. 11: Sources of Interference

1210 — DETERMINE, BY THE WTRU, A FIRST BEAMFORMING MATRIX

1220 — SEND, BY THE WTRU TO A NETWORK ENTITY, AN INDICATION OF THE FIRST BEAMFORMING MATRIX

1230 — RECEIVE, BY THE WTRU FROM THE NETWORK ENTITY, AN INDICATION OF A SECOND BEAMFORMING MATRIX DETERMINED BY THE NETWORK ENTITY FROM AT LEAST THE FIRST BEAMFORMING MATRIX FOR BEAMFORMING DATA FOR TRANSMISSION

1310 — DETERMINE, BY THE WTRU, AN UPLINK (UL) CHANNEL ESTIMATE BASED ON A DOWNLINK (DL) MEASUREMENT OF A DL CHANNEL CORRESPONDING TO THE UL CHANNEL

1320 — DETERMINE, BY THE WTRU, FIRST BEAMFORMING INFORMATION BASED ON THE DETERMINED UPLINK CHANNEL

1330 — RECEIVE, BY THE WTRU FROM THE NETWORK ENTITY FOR BEAMFORMING DATA FOR TRANSMISSION, SECOND BEAMFORMING INFORMATION, THE SECOND BEAMFORMING INFORMATION BEING: (1) BASED ON THE FIRST BEAMFORMING INFORMATION SENT BY THE WTRU TO THE NETWORK ENTITY OR (2) INFERRED BY THE NETWORK ENTITY USING UL CHANNEL-RELATED INFORMATION

1410 — DETERMINE, BY THE WTRU, AN UPLINK (UL) CHANNEL ESTIMATE BASED ON A DOWNLINK (DL) MEASUREMENT OF A DL CHANNEL CORRESPONDING TO THE UL CHANNEL

1420 — RECEIVE AND DECODE A PAYLOAD PERTAINING TO AN INTERFERENCE CHANNEL ASSOCIATED WITH AN INTERFERENCE DIRECTION

1430 — DETERMINE A BEAMFORMING MATRIX INDEX FROM THE DECODED PAYLOAD

1440 — DETERMINE A BEAMFORMING MATRIX OR A BEAMFORMING VECTOR BASED ON THE ESTIMATED UL CHANNEL AND THE INTERFERENCE CHANNEL SUCH THAT THE INTERFERENCE CHANNEL LIES IN A NULL SPACE OF THE BEAMFORMING MATRIX OR THE BEAMFORMING VECTOR

1450 — BEAMFORM, BY THE WTRU, DATA FOR TRANSMISSION USING THE DETERMINED BEAMFORMING MATRIX OR THE DETERMINED BEAMFORMING VECTOR

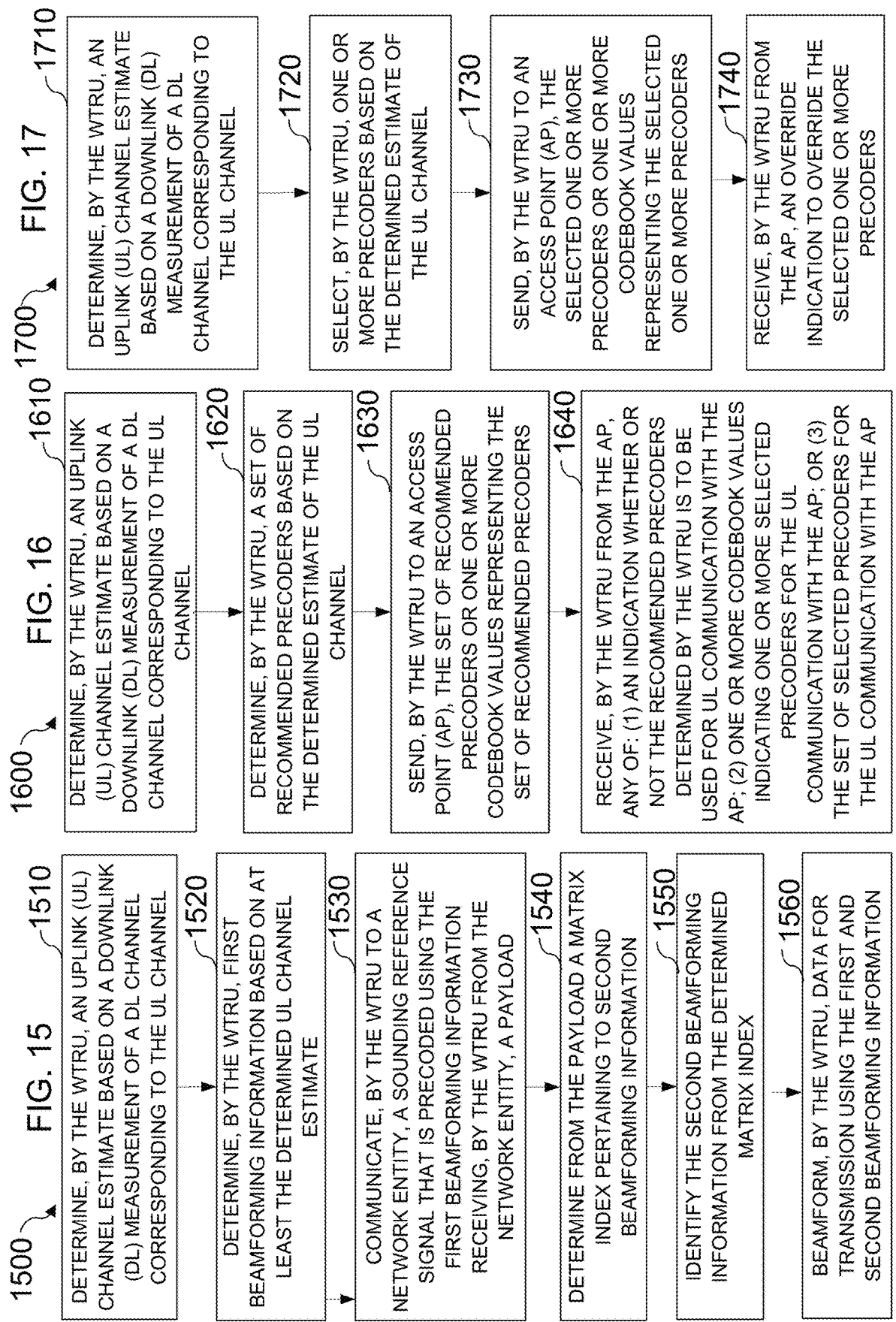

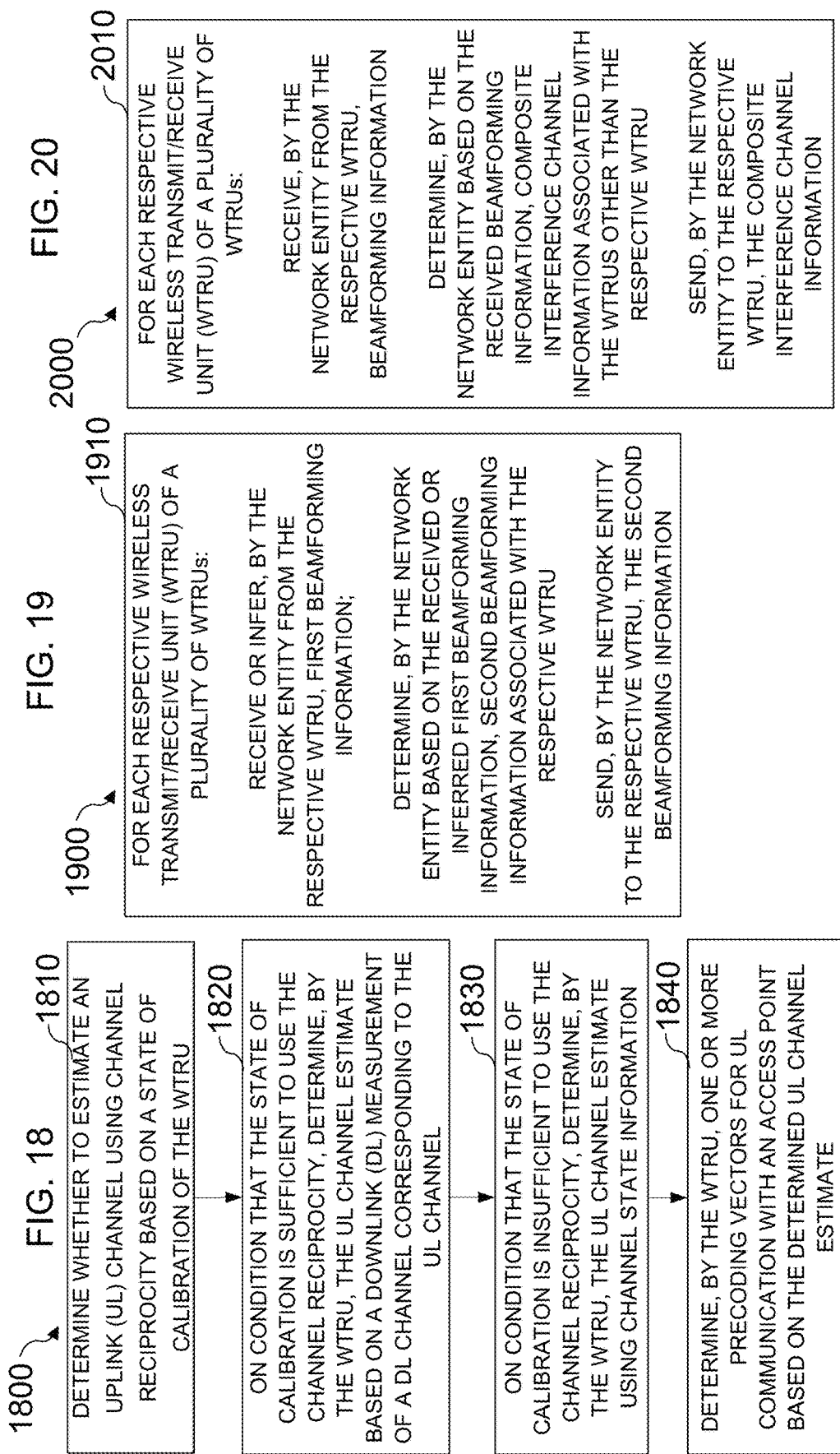

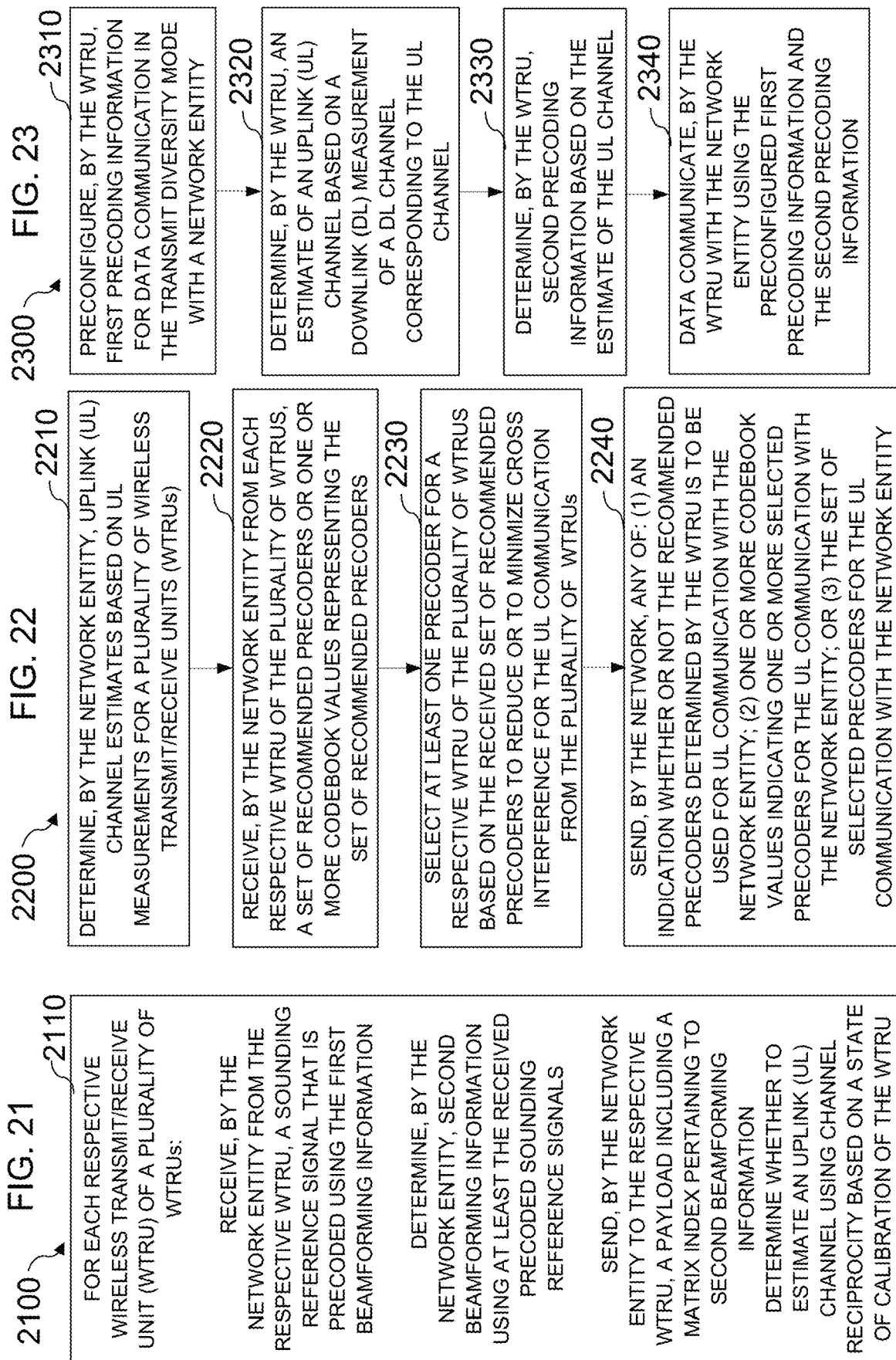

METHODS, APPARATUS, SYSTEMS AND PROCEDURES FOR UPLINK (UL) CHANNEL RECIPROCITY

CROSS REFERENCE TO RELATED APPLICATIONS

This application is a continuation application of U.S. patent application Ser. No. 16/323,157, which is a 371 U.S. National Stage entry of PCT Application No. PCT/US2017/045293, filed Aug. 3, 2017, which claims priority from U.S. Provisional Patent Application No. 62/445,941, filed Jan. 13, 2017, U.S. Provisional Patent Application No. 62/416,476, filed Nov. 2, 2016, U.S. Provisional Patent Application No. 62/400,969, filed Sep. 28, 2016, and U.S. Provisional Patent Application No. 62/373,203, filed Aug. 10, 2016, the contents of each of which is hereby incorporated herein by reference as if fully set forth.

FIELD

The present invention relates to the field of wireless communications and, more particularly, to methods, apparatus, systems and procedures using UL channel reciprocity.

RELATED

Generally, conventional two-way communication systems have channel feedback.

BRIEF DESCRIPTION OF THE DRAWINGS

A more detailed understanding may be had from the Detailed Description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals in the Figures indicate like elements, and wherein:

FIG. 6 is a diagram illustrating representative procedures for Asymmetric Interference (AI) Avoidance for uplink (UL) Multiple-In Multiple-Out (MIMO);

FIG. 7 is a diagram illustrating a representative procedure using a single spatial stream transmission and a single codebook;

FIG. 8 is a diagram illustrating a representative procedure using a multi-spatial-stream transmission and a single codebook;

FIG. 9 is a diagram illustrating a representative procedure using WTRU-aided interference coordination;

FIGS. 10A and 10B are diagrams illustrating representative procedures using beamformed transmit diversity;

FIG. 11 is a diagram illustrating sources of interference;

FIG. 12 is a diagram illustrating a representative method implemented by a WTRU;

FIG. 13 is a diagram illustrating another representative method implemented by a WTRU;

FIG. 14 is a diagram illustrating a further representative method implemented by a WTRU;

FIG. 15 is a diagram illustrating an additional representative method implemented by a WTRU;

FIG. 16 is a diagram illustrating a yet further representative method implemented by a WTRU;

FIG. 17 is a diagram illustrating a yet additional representative method implemented by a WTRU;

FIG. 18 is a diagram illustrating a yet another representative method implemented by a WTRU;

FIG. 19 is a diagram illustrating a representative method implemented by a NE;

FIG. 20 is a diagram illustrating another representative method implemented by a NE;

FIG. 21 is a diagram illustrating a further representative method implemented by a NE;

FIG. 22 is a diagram illustrating an additional representative method implemented by a NE;

FIG. 23 is a diagram illustrating a further representative method implemented by a WTRU for a transmit diversity mode;

DETAILED DESCRIPTION

A detailed description of illustrative embodiments may now be described with reference to the figures. However, while the present invention may be described in connection with representative embodiments, it is not limited thereto and it is to be understood that other embodiments may be used or modifications and additions may be made to the described embodiments for performing the same function of the present invention without deviating therefrom.

Although the representative embodiments are generally shown hereafter using wireless network architectures, any number of different network architectures may be used including networks with wired components and/or wireless components, for example.

Figure 1:
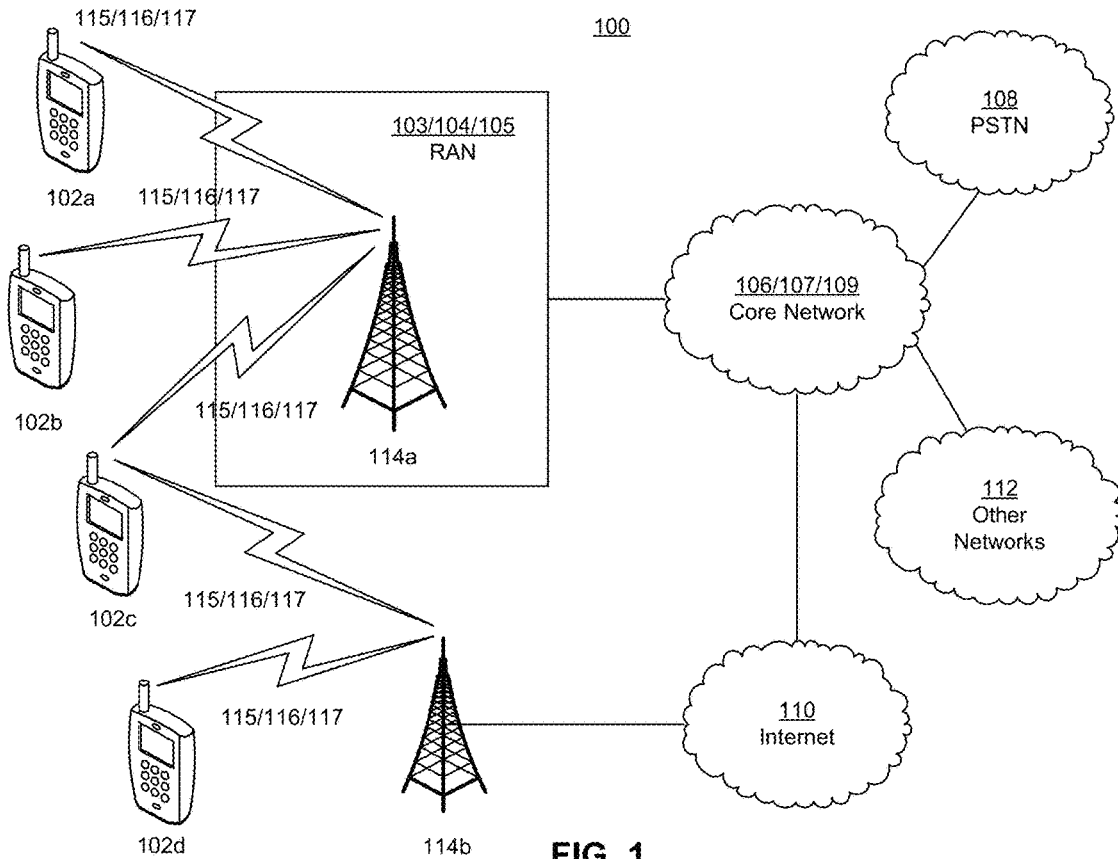
FIG. 1 is a system diagram illustrating an example communications system in which one or more disclosed embodiments may be implemented.

FIG. 1 is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1, the communications system 100 may include wireless transmit/receive units (WTRUs) 102a, 102b, 102c, 102d, a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like. The WTRU 102a, 102b, 102c and 102d is interchangeably referred to as a UE.

The communications systems 100 may also include abase station 114a and/or abase station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the other networks 112. By way of example, the base stations 114a, 114b may be a base transceiver station (BTS), a Node-B, an eNode-B (or eNB), a gNode-B (gNB), a Home Node B, a Home eNode-B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In another embodiment, the base station 114a may employ multiple-input multiple output (MIMO) technology and may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1 may be a wireless router, Home Node B, Home eNode-B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM, UMTS, CDMA 2000, WiMAX, or WiFi radio technology. The core network 106/107/109, for example, may be use, as any of or any combination of: (1) a 5G capable core network; (2) a 4G capable core network; (3) a 3G capable core network; (4) a 2G capable core network; (5) an LTE-A capable core network; (6) an LTE capable core network; (7) a GERAN capable core network; (8) a UTRAN capable core network; and/or (9) a UMTS capable core network, among others.

The core network 106/107/109 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1 may be configured to communicate with the base station 114a, which may employ a cellular-based radio technology, and with the base station 114b, which may employ an IEEE 802 radio technology. Some or all of the WTRUs 102a, 102b, 102c, 102d in the communication system 100 may communicate with other devices using Bluetooth technology.

Figure 2:
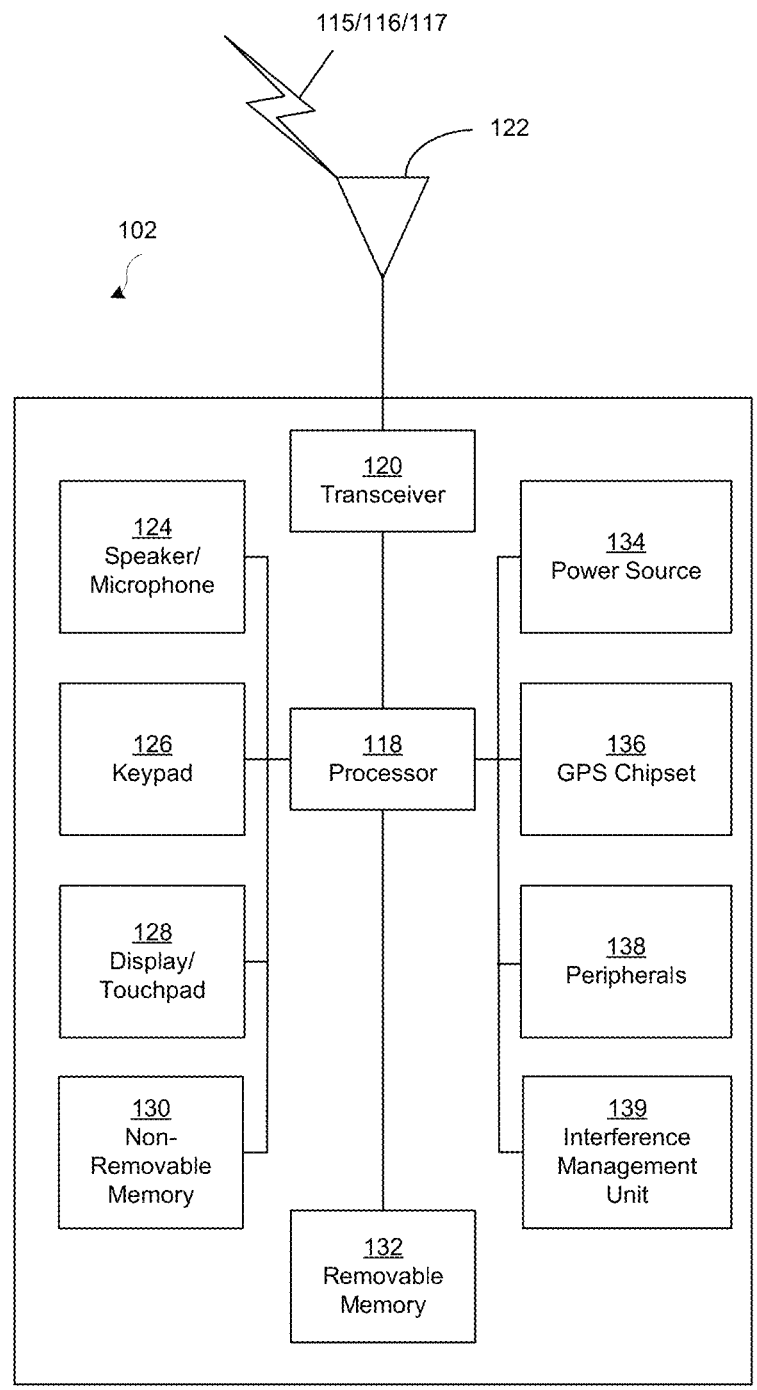
FIG. 2 is a system diagram illustrating an example wireless transmit/receive unit (WTRU) that may be used within the communications system illustrated in FIG. 1.

FIG. 2 is a system diagram illustrating an example WTRU 102. As shown in FIG. 2, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 2 depicts the processor 118 and the transceiver 120 as separate components, it will be appreciated that the processor 118 and the transceiver 120 may be integrated together in an electronic package or chip.

The transmit/receive element 122 may be configured to transmit signals to and/or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 2 as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and/or receiving wireless signals over the air interface 115/116/117.

The transceiver 120 may be configured to modulate the signals that are to be transmitted by the transmit/receive element 122 and/or to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

The WTRU 102 may include a full duplex radio for which transmission and reception of some or all of the signals (e.g., associated with particular subframes for both the uplink UL (e.g., for transmission) and downlink DL (e.g. for reception) may be, for example partially or fully, concurrent and/or simultaneous. The radio (e.g., a full duplex radio) may include an interference management unit 139 to reduce and/or substantially eliminate SINTF via either hardware (e.g., a choke) or signal processing via a processor (e.g., a separate processor (not shown) or via processor 118).

Figure 3:
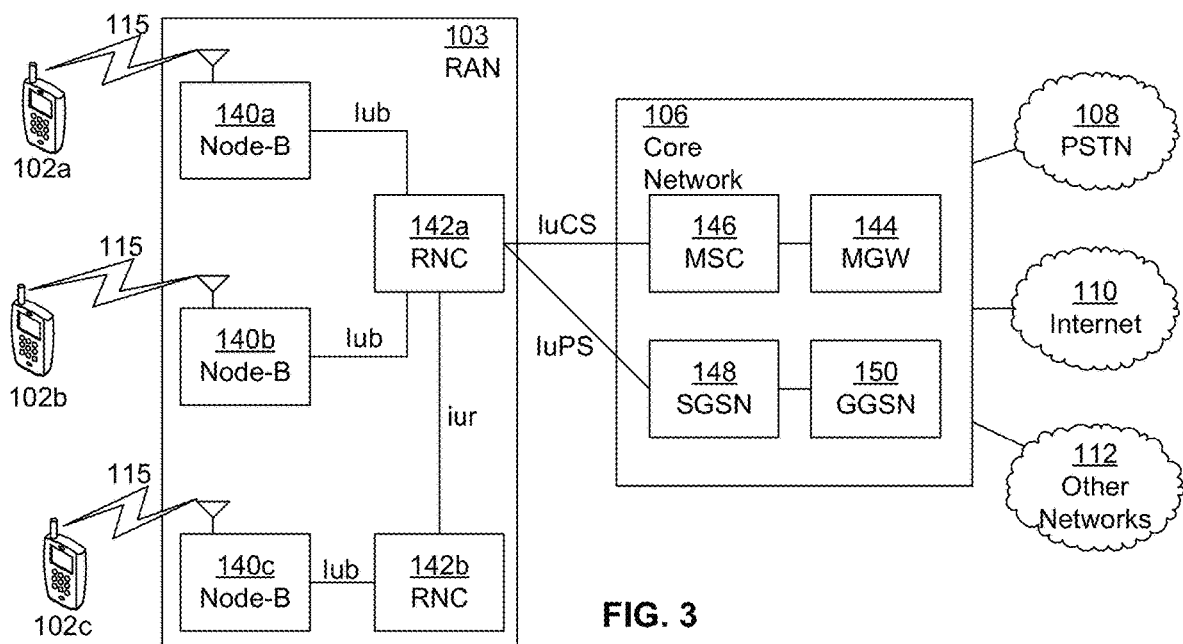
FIG. 3 is a system diagram illustrating an example radio access network and another example core network that may be used within the communications system illustrated in FIG. 1.

FIG. 3 is a system diagram illustrating the RAN 103 and the core network 106 according to another embodiment. As noted above, the RAN 103 may employ a UTRA radio technology to communicate with the WTRUs 102a, 102b, 102c over the air interface 115. The RAN 103 may also be in communication with the core network 106. As shown in FIG. 3, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 3, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 3 may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between the and the WTRUs 102a, 102b, 102c and IP-enabled devices.

As noted above, the core network 106 may also be connected to the other networks 112, which may include other wired and/or wireless networks that are owned and/or operated by other service providers.

Figure 4:
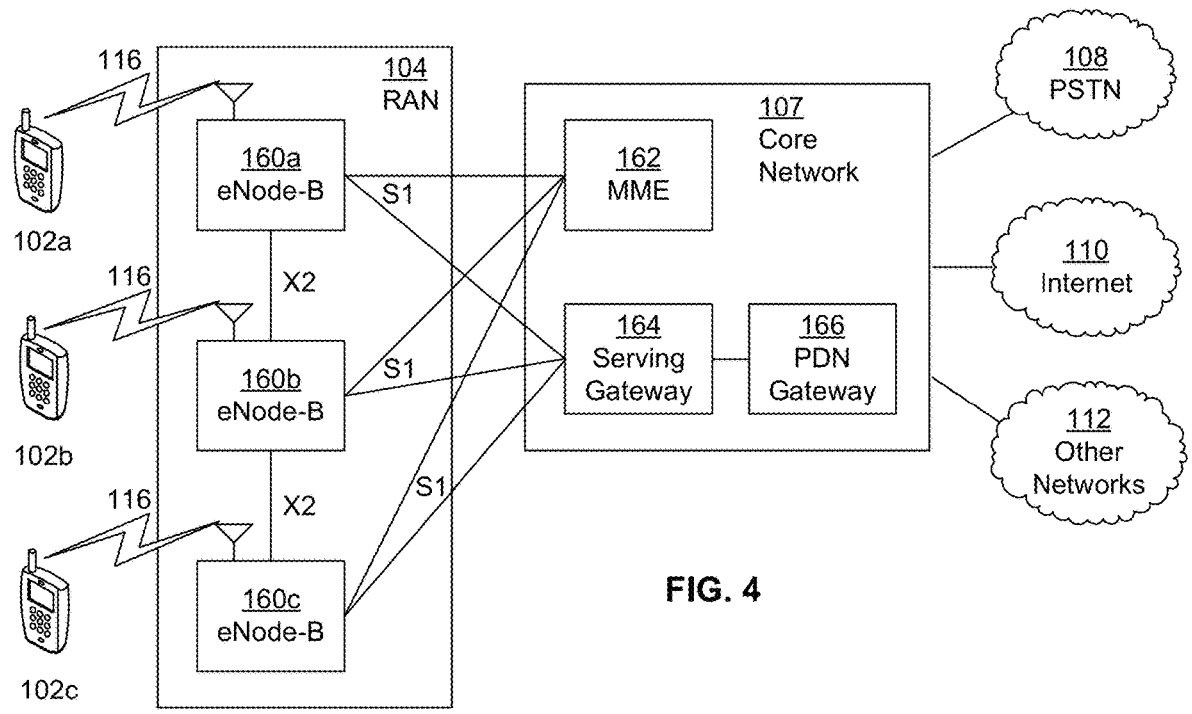
FIG. 4 is a system diagram illustrating another example radio access network and another example core network that may be used within the communications system illustrated in FIG. 1.

FIG. 4 is a system diagram illustrating the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 4, the eNode-Bs 160a, 160b, 160c may communicate with one another over an X2 interface. The eNode-B may include a full duplex radio similar to that of the WTRU (e.g., with an interference management unit). The core network 107 shown in FIG. 4 may include a mobility management entity (MME) 162, a serving gateway (SGW) 164, and a packet data network (PDN) gateway (or PGW) 166. While each of the foregoing elements are depicted as part of the core network 107, it will be appreciated that any of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may perform other functions, such as anchoring user planes during inter-eNode-B handovers, triggering paging when DL data is available for the WTRUs 102a, 102b, 102c, managing and storing contexts of the WTRUs 102a, 102b, 102c, and the like.

The serving gateway 164 may be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the other networks 112, which may include other wired and/or wireless networks that are owned and/or operated by other service providers.

Figure 5:
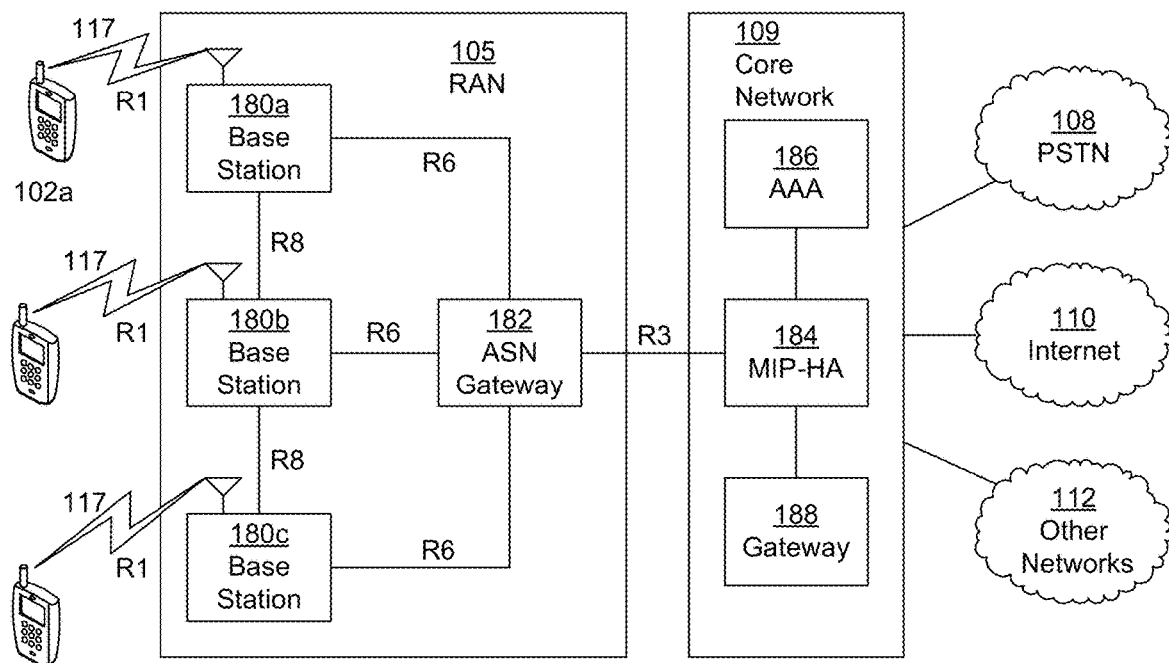
FIG. 5 is a system diagram illustrating a further example radio access network and a further example core network that may be used within the communications system illustrated in FIG. 1.

FIG. 5 is a system diagram illustrating the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 5, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. The base station 180a, for example, may use multiple antennas to transmit wireless signals to, and/or receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 5, the RAN 105 may be connected to the core network 109. The communication link between the RAN 105 and the core network 109 may be defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any of these elements may be owned and/or operated by an entity other than the core network operator.

The MIP-HA 184 may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. The gateway 188 may provide the WTRUs 102a, 102b, 102c with access to the other networks 112, which may include other wired and/or wireless networks that are owned and/or operated by other service providers.

Although not shown in FIG. 5, it will be appreciated that the RAN 105 may be connected to other ASNs, other RANs (e.g., RANs 103 and/or 104) and/or the core network 109 may be connected to other core networks (e.g., core network 106 and/or 107. The communication link between the RAN 105 and the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Although the WTRU is described in FIGS. 1-5 as a wireless terminal, it is contemplated that in certain representative embodiments such a terminal may use (e.g., temporarily or permanently) wired communication interfaces with the communication network.

In certain representative embodiments, method apparatus and/or system for New Radio (NR) may be implemented and may use channel reciprocity. The process and/or procedure that enable channel reciprocity based UL MIMO (e.g., for Time Division Duplex (TDD)) may include partial reciprocity and/or full reciprocity.

For example, certain representative operations, procedures and/or methods may use: (1) UL Angle reciprocity; (2) AI Avoidance for MIMO (e.g., UL MIMO and/or DL MIMO); (3) UL multi-user (MU)-MIMO based on interference feedback (e.g., such as (i) single spatial stream transmission and a single codebook, (ii) multi-spatial-stream transmission with a single codebook; and/or (iii) multi-spatial-stream transmission with a double codebook; (4) UL MU-MIMO based on Precoded Sounding Reference Signals (SRSs); (5) UL beamformed reciprocity; (6) DL channel measurement with asymmetric interference at the WTRU; (7) UL channel reciprocity beamforming via or with a codebook; (8) an access point (AP) (e.g., an eNB, gNB or other AP) that overrides a WTRU autonomous UL precoding determination; (9) a WTRU calibration indication; and/or (10) beamformed transmit-diversity, among others.

Although most embodiments relate to UL MIMO, one of skill understands that certain embodiments can equally relate to massive MIMO that may include beamforming operations, as well.

DL channel reciprocity has been used in LTE systems. For example, a base station (BS) may acquire channel information through a UL sounding reference signal transmission and may apply the channel information for precoding (e.g., beamforming) DL data and/or control transmissions. For large scale antenna array systems, schemes based on channel reciprocity may lead to reductions (e.g., significant reductions) in feedback overhead and may be used (e.g., may be appropriate) in practical deployments. For the next generation of mobile communication systems, it is contemplated that TDD may be the main mode of operation and that large scale antenna array systems may be used for high frequency bands. Utilizing channel reciprocity may enable (e.g., may become a key enabler) for wireless communication systems (e.g., future wireless communication systems).

In certain representative embodiments, a large number (for example, a set and/or an array) of antenna elements on the WTRU side (e.g., in an amount greater than a threshold) for certain frequency bands (e.g., for intermediate and/or or higher frequency bands (e.g., above a threshold)) may be implemented. For example, at higher frequencies the size or the antenna and/or its complexity may be reduced. It is contemplated that for the next generation of mobile communication systems, the WTRU may operate in higher frequency bands and may use a large antenna array on the WTRU side, for example to enable beamforming in the UL. In certain representative embodiments, channel reciprocity may be implemented, for example to estimate the UL channel state information (CSI).

In a New Radio (NR) network, WTRU-based multiple transmissions may be implemented. For example, the WTRU-based multiple transmissions may include gNB assisted WTRU MIMO, gNB-driven WTRU MIMO and/or gNB directed WTRU MIMO.

For example, in gNB-driven WTRU MIMO, the gNB may control the WTRU MIMO scheme/operation/procedure. The gNB may identify the multiple antenna scheme and antenna weights that the WTRU is to use for MIMO transmission. For example, representative schemes/operations/procedures may include any of the following:
(26) that the WTRU may send a multi-dimensional SRS to the gNB (e.g., the dimensions may be based on the WTRU's transmit antennas and/or the WTRU's effective transmit beams (for example, in the case of an analog beam based design/operation such as for higher frequency transmission and/or for a digital beam-formed design/operation));
(27) that the gNB may estimate an effective uplink MIMO channel based on the SRS and/or may estimate the best precoder;
(28) that the gNB may indicate and/or include the precoder to be used by the WTRU in a message (e.g., signaling) sent to the WTRU (e.g., over a downlink control channel, in a UL grant and/or in other control signaling) (for example, the precoder may be indicated by sending a codeword and/or a precoding/beamforming matrix index (PMI) from a codebook (e.g., a well-designed codebook) to the WTRU. The precoder may be included by explicitly sending the precoder to be used to the WTRU); and/or
(29) that the WTRU may use the indicated or included precoder to transmit information to the gNB.

The gNB-driven WTRU MIMO may be suitable for generalized UL MU MIMO and may or may not limit the WTRU to a single stream transmission. For example, in certain representative embodiments, the gNB may select WTRU MIMO precoders to limit and/or reduce interference between the multiple UL WTRUs.

In autonomous WTRU MIMO and/or WTRU-directed MIMO, the WTRU autonomously may decide and/or determine the multiple antenna scheme and antenna weights that the WTRU may use for the MIMO (e.g., UL MIMO) transmission. For example, in this case, the WTRU may be required to know and/or may determine the channel (e.g., the channel estimate). The WTRU may have the channel (e.g., the channel estimate) fed to it (e.g., forwarded, as feedback) to it by the gNB (and/or another network entity), for example based on an UL multi-dimensional SRS sent by the WTRU. The WTRU may use the estimated channel to derive the precoder and/or may transmit information to the gNB (e.g., using the estimated channel information/derived precoder information.

The use of UL beamforming for the next generation of mobile communication systems may enhance the performance of the system and may have an impact (e.g., a minimum impact) on control and feedback signaling. Certain representative embodiments may include apparatus, operations, procedures and/or methods that may be used to enhance the reciprocity property of the channel (e.g., communication channel), for example to improve performance in the user plane and/or the control plane. Assisting mechanisms (e.g., to alleviate secondary issues associated with channel reciprocity such as asymmetric interference and/or measurement inaccuracies) may be used with certain channel reciprocity operations, procedures and/or methods.

The validity of channel reciprocity may depend on any of: (1) channel time coherency (2) channel frequency coherency, (3) interference at the transmitter and/or (4) interference at the receiver. The sources (e.g., the main sources) of interference in the DL at the WTRU receiver may be neighboring base stations, and the sources (e.g., main sources) of interference in the UL at the base station may be inter-cell and intra-cell WTRUs. It is contemplated that DL channel information may not be used (e.g., directly used) by the WTRU as an estimate of the channel for the UL or vice versa (e.g., UL channel information may not be used (e.g., directly used) by the base stations as an estimate of the channel for the DL).

For conventional systems that use a MU-MIMO mode of operation in the UL, the base station may signal the precoding vectors to the WTRUs, for example to maintain good orthogonality among the transmissions from the WTRUs. In certain representative embodiments, for UL channel reciprocity, a WTRU may determine (e.g., autonomously determine, for example without network control) its UL beamforming/precoding vector/matrix. In the case of MU-MIMO, apparatus, operations, and/or procedures may be used (e.g., appropriate, for example to ensure that multiple co-scheduled WTRUs do not interfere with one another at the base station receiver.

Representative Procedures for UL Full Channel Reciprocity

Beamforming in mmWave bands, for example in the range between about 30 GHz and 300 GHz) may use: (1) feedback (e.g., precise feedback) procedures and/or (2) may use a codebook (e.g., an efficiently designed codebook), among others. Mobile units, for example WTRUs, may be equipped with a large number of antennas, for example because of the smaller (e.g., much smaller) size of the antennas, e.g., using or operating at the mmWave, (e.g., the higher frequency bands). The representative implementations may be based on a cross-polarized or correlated $N_H \times N_V$ antenna array system (where H and V denote the horizontal and vertical polarizations). Implementations based on other types of polarization (such as circular polarization) may also be used. As the number of antennas increase, a codebook with a larger number of elements may be used (e.g., may be appropriate to facilitate accurate beamforming, for example according to the channel). In certain representative embodiments, channel reciprocity may be used to estimate the UL channel, for example to eliminate or substantially reduce large codebook implementations (e.g., the need for larger codebooks and/or codebooks above a threshold number of elements), and large feedback overhead (e.g., associated with communicating the codebook values between sender and receiver). The UL channel may be estimated from (e.g., directly from) the observed DL channel, and may be used for the UL beamformer design: $\tilde{H}_{UL} = \tilde{H}_{DL}$.

In a real system, the accuracy of the DL measurement may be reduced and/or limited due to a number of factors, such as: (1) noise, (2) UL/DL asymmetric interference and/or (3) hardware impairments, among others. In certain representative embodiments, beamforming may be based on the statistics of the estimated $\tilde{H}_{UL}$, such as its covariance matrix, $$R = E(\tilde{H}_{UL}\tilde{H}^{UL H}).$$

In FDD-based systems, it is contemplated to use the DL covariance matrix for UL beamforming, for example, on condition that or as long as the frequency difference between the UL and the DL is within a threshold amount (e.g., not significant enough to cause a major difference in properties of the channel). In cases where there may be some difference, a linear or non-linear transformation on the DL channel may be used to estimate the UL channel.

The advantages of UL channel reciprocity may include any of the following: (1) reduced control signaling overhead in the DL; (2) the base station may not signal (e.g., may not need to signal) the precoding matrix for the UL to the WTRU; (3) reduced sounding reference symbol overhead in the UL, for example to be used by the base station for the UL channel estimation; (4) mitigated channel aging (e.g., channel aging problem), for example due to the reduced latency of the UL CSI from the base station.

Representative Procedures for UL Partial Channel Reciprocity

In certain representative embodiments, a representative precoder may be implemented, for example based on a precoder design scheme for the UL MIMO (e.g., to enable UL reciprocity in scenarios where partial channel information is available at the WTRU). In certain representative embodiments, feedback on partial channel information that may otherwise be sent by the eNB is eliminated and/or substantially reduced. The precoder scheme may be based on a multiple codebook precoder structure, for example as a way to support the implementation of beamforming with a number or an array (e.g., a large number) of antennas for UL transmission. In certain representative embodiments, other codebook precoding structures may be used including higher order structures, for example: (1) a double codebook precoding structure; and/or 2) a triple codebook precoding structure, among others. One of skill in the art understands that precoding that uses and/or involves three or more codebooks can be similarly implemented. The beamformed signal to be sent to the network access point (e.g., eNodeB (eNB) or other access point) from one WTRU may be denoted by Equation 1 as follows:

$$y = W_1 W_2 x \quad (1)$$

where $W_1$ is the first beamforming matrix, $W_2$ is the second beamforming matrix, and x is the transmit data symbol vector from the WTRU. To reduce the control overhead (e.g., the appropriate and/or the required control overhead), the derivation mechanism and selection process of $W_1$ and $W_2$ may be split into two parts, as a WTRU-directed part and an eNB-directed part, respectively, $W_1$: WTRU driven
$W_2$: eNB driven where: (1) the WTRU driven beamformer $W_1$ may track low rate channel variations in any of: (1) time and/or frequency; and (2) the eNB driven beamformer $W_2$ may enable short term corrections. The eNB (e.g., network access point or network entity) may direct the WTRU in selection of $W_2$, and $W_1$ may be decided and/or determined by the WTRU itself (e.g., the determination of $W_1$ may not be under the control of the eNB).

It is contemplated that in certain representative embodiments, the beamformer roles may be exchanged with $W_1$, decided and/or determined by the eNB and $W_2$ decided and/or determined by the WTRU.

Using rank information, a WTRU procedure for UL beamforming may include any of the following operations:

(1) The WTRU may estimate the UL channel based on one or more DL measurements, (e.g., $\tilde{H}_{UL} \cong F(\overline{\mathbf{H}}_{DL}{}^T)$). For example, the DL channel information may be derived from DL reference symbols (e.g., specifically used for channel estimation) and/or from demodulation reference symbols embedded in the DL data/control transmissions, among others. The function F above indicates that the DL channel may be transformed by a function to improve the UL channel estimate. In certain representative embodiments, this function may be a linear transformation (an identity matrix if no transformation is appropriate and/or needed) or a non-linear transformation of any order.

(2) The WTRU may determine the precoding/beamforming matrix/vector $W_1$ based on a channel-related measurement. For example, the precoding matrix $W_1$ may be derived from the estimated $\tilde{H}_{UL}$ or the precoding matrix $W_1$ may be determined based on all or a subset of eigenvectors of its covariance matrix R. The WTRU may communicate the precoding matrix/vector $W_1$ to the eNB to enable the eNB to estimate the precoding/beamforming matrix/vector $W_2$. As one example, in one procedure (e.g., the implicit procedure), the WTRU may send a precoded reference signal to the eNB and the eNB may estimate the precoding matrix/vector $W_2$ based on the precoded reference signal. As a second example, in a second procedure (e.g., the explicit procedure), the WTRU may feed back or provide a representation of the precoding matrix/vector $W_1$ to the eNB. The representation may be one or more of the following: (i) a PMI value that represents $W_1$; (ii) a compressed explicit set of values for the precoding matrix/vector $W_1$; (iii) a differential PMI/vector indicating a difference between a vector previously sent by the WTRU to the eNB<(e.g., across time and/or frequency). The eNB may infer the precoding matrix/vector $W_1$ based on a rule that is agreed upon between the WTRU and the eNB. The rule may take the long-term channel statistics as the input and generate a precoding/beamforming matrix/vector. The WTRU may determine the precoding/beamforming matrix/vector $W_1$ based on the rule and an estimate of the UL channel (e.g., using channel reciprocity), and the eNB may infer the precoding/beamforming matrix/vector $W_1$ based on the same rule and the actual measurement of the UL channel.

(3) The WTRU may monitor the DL control channel, may decode a related payload and/or may determine the precoding/beamforming matrix index (PMI) pertaining to the precoding matrix/vector $W_2$. For example, the decoded PMI may provide a further update on the channel direction to improve the accuracy of the beamforming. Since the estimated $\tilde{H}_{UL}$ may be outdated, the eNB driven precoding matrix/vector $W_2$ may be used as a correction to improve matching of the overall precoder to the current channel. The WTRU may identify the precoding matrix/vector $W_2$ beamforming matrix explicitly or implicitly from the decoded PMI.

(4) The WTRU may beamform the transmit data vector as $y=W_1W_2x$.

Representative Procedures for UL Angle Reciprocity

In certain representative embodiments, the reciprocity between the DL angle of arrival (AOA) and the UL angle of departure (AOD) may be used for WTRUs that employ or use certain types of beamforming (e.g., hybrid beamforming in which the WTRU may use a combination of analog and digital beamforming). For example, the WTRU may measure the AOA of the signal in the DL and may use the measured AOA to determine the beamforming vector for its UL transmissions. It is contemplated that the UL and DL antenna responses for a uniform linear array ULA may be as follows in Equations 2:

$$a_{UL}(\vartheta) = \begin{bmatrix} 1 \\ e^{-j2\pi\Delta \frac{f_{UL}}{f_0}\sin(\vartheta)} \\ \vdots \\ e^{-j2\pi\Delta \frac{f_{UL}}{f_0}(N-1)\sin(\vartheta)} \end{bmatrix} \text{ and}$$

$$a_{DL}(\vartheta) = \begin{bmatrix} 1 \\ e^{-j2\pi\Delta \frac{f_{DL}}{f_0}\sin(\vartheta)} \\ \vdots \\ e^{-j2\pi\Delta \frac{f_{DL}}{f_0}(N-1)\sin(\vartheta)} \end{bmatrix},$$

(2)

where $f_0$ is the carrier frequency that the ULA is designed for, $\Delta$ is the antenna spacing (in wavelengths) at that frequency (e.g., at the $f_0$ carrier frequency), $\vartheta$ is the AOA/AOD.

The UL and DL antenna responses may be related as given in Equation 3:

$$a_{UL}(\vartheta)=T(\vartheta)a_{DL}(\vartheta), \quad (3)$$

where the translation matrix $T(\vartheta)$ is given by Equation 4 as follows:

$$T(\vartheta) = \text{diag}\left(1, e^{j2\pi\Delta \frac{f_{DL}-f_{UL}}{f_0}\sin(\vartheta)}, \ldots, e^{j2\pi\Delta \frac{f_{DL}-f_{UL}}{f_0}\sin(\vartheta)}\right). \quad (4)$$

For a TDD mode of operation, where $f_{DL}=f_{UL}$, the translation matrix $T(\vartheta)$ may reduce to an identity matrix, for example as given in Equation 5:

$$a_{UL}(\vartheta)=a_{DL}(\vartheta), \quad (5)$$

In certain representative embodiments, the WTRU may use the array response vector $a_{UL}(\vartheta)$ as $W_1$ in the Representative Procedures for Partial Channel Reciprocity described herein. For example, $W_2$ may be signaled by the base station. In certain representative embodiments, $a_{UL}(\vartheta)$ may be employed in the analog domain to maximize the beamforming gain in a direction of the base station and $W_2$ may be employed in the digital domain (e.g., to maximize the Signal-to-Noise ratio (SNR) and/or to minimize the interference from other WTRUs). According to certain embodiments, the AOA may be an Elevation and Azimuth (EA) EA AOA and/or the AOD may be an EA AOD.

Representative Procedures for Asymmetric Interference (AI) Avoidance for UL MIMO FIG. 6 is a diagram illustrating representative procedures for AI Avoidance for UL MIMO.

Referring to FIG. 6, a network 600 may include a first cell 610-1 with a coverage area 615-1 and a second cell 610-2 with a coverage area 615-2. An AP 620-1 (for example, an eNB, gNB, and/or other Radio Access Network (RAN) entity, hereafter sometime referred to as an AP/eNB) may serve the first cell 610-1 and an AP/eNB 620-2 may serve the second cell 610-2. A first WTRU 102-1 may be in the coverage area 615-1 of the first cell 610-1. A second WTRU 102-2 may be in the coverage area 615-2 of the second cell 610-2. The WTRU 102-2 may transmit and/or send an interference signal (e.g., interference channel v). The AP/eNB 620-1 may determine Precoding Matrix (PM) Information (e.g., a PM index) based on the interference channel v and/or may send a signal (e.g., a desired DL signal) to the WTRU 102-1. For example, the desired signal may be precoded based on the interference channel v.

In certain representative embodiments, an AI phenomenon may result from inter-cell interference and may cause issues with (e.g., concern over the use of channel reciprocity). If the AP/eNB 620-1 experiences interference at and/or in a specific spatial direction, a WTRU 102-1 may not be able to determine or know of the interference in that spatial direction based on the DL transmission of the AP/eNB 620-1. If the WTRU 102-1 can acquire UL interference information, the WTRU 102-1 may adapt to the UL interference to avoid transmission on and/or in the same channel direction. The beamforming matrix W, as illustrated in Equation 6, may be used to divert the direction of UL transmission away from the interference (e.g., the interference channel v), $$y=Wx, \quad (6)$$

where W is the beamforming matrix, x is the transmit data symbol vector and y is the beamformed transmit vector.

In certain representative embodiments, the WTRU 102 may perform any of: (1) an estimation of the UL channel based on the DL measurement (e.g., $\tilde{H}_{UL} \cong \tilde{H}_{DL}^T$); (2) monitor a DL control channel; (3) decoding a related payload; (4) determining the PMI pertaining to the direction of the interference channel v (sometimes shown as υ); (5) an estimation of the precoding/beamforming matrix/vector W based on the estimated channel and the interference channel v such that the interference channel v lies in the null space of precoding/beamforming matrix/vector W, or the precoding/beamforming matrix/vector W and the interference channel v (e.g., W⊥v); and/or (6) beamforming of the transmit data vector as y=Wx.

In certain representative embodiments, the WTRU 102 may estimate the precoding/beamforming matrix/vector W, (e.g., based on the estimated channel) and the interference channel v such that the precoding/beamforming matrix/vector W minimizes a metric associated with a mean-squared-error (MSE). For example, the MSE criterion may be (i) a MSE of a serving AP/eNB 620 plus the interference in channel υ, e.g., the MSE+α Interference where a is an appropriately chosen parameter; and/or (ii) a minimized maximum of the MSE and interference in channel υ, e.g., to minimize a maximum of (MSE, Interference). In certain representative embodiments, the MSE criterion may be used with (e.g., only with) statistical knowledge of the interference channel υ.

Representative Procedures for UL MU-MIMO Based on Interference Feedback

Representative procedure may be implemented to reduce inter-user interference with a minimum requirement on the AP/eNB feedback for UL MU-MIMO communications. In certain communications (e.g., LTE, LTE-A, new radio and other communications beyond or different from LTE, LTE-A and new radio), multiple WTRUs 102 (e.g., a plurality or cluster of WTRUs 102) may be paired (e.g., transparently) to transmit on the same frequency-time resources. The AP/eNB 620 may assign, a WTRU 102, some WTRUs 102 or each of the plurality of WTRUs 102, a PMI to orthogonalize their UL transmission. Performance may be reduced and/or limited due to a limited resolution of the PMI.

To improve the performance of the UL MIMO, a WTRU 102 may rely on channel reciprocity to derive an estimate for the direction of UL beamforming/precoding, and may be assisted by the AP/eNB 620 to attempt to orthogonalize its transmission to other WTRUs 102 in the cluster. WTRUs 102 may use, for example: (1) a single spatial stream transmission and a single codebook; (2) multi-spatial-stream transmission with a single code-book; and/or (3) multi-spatial-stream transmission with a higher order codebook (e.g., a double codebook, a triple codebook, or a further order codebook). For example, in certain representative embodiments, each WTRU 102 may transmit a single spatial stream (e.g., only one spatial stream) such that successive transmissions lie in the same or substantially the same direction (e.g., in the same or substantially the same channel) and the precoding codebook may be a single codebook. In other representative embodiments, a WTRU 102 may transmit multiple spatial streams and the precoding codebook may be a single codebook or a higher order codebook (e.g., a double codebook or a triple codebook, among others).

Representative Procedures Using a Single Spatial Stream Transmission and a Single Codebook FIG. 7 is a diagram illustrating a representative procedure using a single spatial stream transmission and a single codebook. Referring to FIG. 7, the representative procedure 700 may include two or more WTRUs 102 (e.g., two user devices or WTRUs 102-1 and 102-2) and an AP/eNB 620. One or each of the WTRUs 102-1 and/or 102-2 may be advised of an interference direction $v_1$ and $v_2$. by a different PMI reflecting and/or indicating the interference direction $v_1$ and $v_2$.

A representative procedure (e.g., an overall procedure) may include any of the following: the WTRU 102-1 may: (1) estimate the UL channel based on the DL measurement (e.g., $\tilde{H}_{UL} \cong \tilde{H}_L$); (2) monitor the DL control channel; (3) decode a related payload; (4) determine the PMI pertaining to an interference direction v (e.g., the interference direction $v_2$). For example, the interference direction may be the direction of transmission of other users in the MU-MIMO cluster. (For example, the vector v may represent the direction of the interference of one WTRU 102-2 (e.g., only one interfering WTRU 102-2) or an aggregated direction of the interference); (5) estimate the precoding/beamforming matrix/vector W based on the estimated channel and the interference channel/direction v such that the interference channel/direction v may lie in a null space of the precoding/beamforming matrix/vector W, or the precoding/beamforming matrix/vector W and the interference channel v (e.g., W⊥v); and/or (6) beamform the transmit data vector as y=Wx.

In certain representative embodiments, the WTRU 102 may estimate the precoding/beamforming matrix/vector W, (e.g., based on the estimated channel) and the interference channel/direction v such that the precoding/beamforming matrix/vector W may minimize a metric associated with a mean-squared-error (MSE). For example, the MSE criterion may be (i) a MSE of a serving AP/eNB 620 plus the interference in channel $v_i$, e.g., MSE+$\Sigma\alpha_i$ Interference where $\alpha_i$ is an appropriately chosen parameter; and/or (ii) a minimized maximum of the MSE and interference in channel $v_i$, e.g., to minimize a maximum of (MSE, Interference). In certain representative embodiments, the MSE criterion may be used with (e.g., only with) statistical knowledge of the interference channel/direction υ.

Representative Procedures Using a Multi-Spatial-Stream Transmission with a Single Codebook FIG. 8 is a diagram illustrating a representative procedure using a multi-spatial-stream transmission and a single codebook. Referring to FIG. 8, the representative procedure 800 may use any number of APs/eNBs 620 (e.g., gNBs, eNBs and/or RAN entities) and any number of WTRUs 102 (e.g., WTRUs 102-1, 102-2, 102-3 ... 102-K, among others). The UL MU-MIMO may have multi-spatial-stream transmissions based on interference feedback. The APs/eNBs 620 may coordinate the precoding/beamforming matrix selection at the WTRUs 102 for UL MU-MIMO transmissions, for example so that the mutual interference may be reduced. In certain representative embodiments, a procedure may be implemented such that if K WTRUs 102-1, 102-2, 102-3 ... 102-K (where K is a positive integer) simultaneously transmit to a single AP/eNB 620, a first WTRU 102-1 of the K WTRUs 102-1, 102-2, 102-3 ... 102-K may autonomously determine its own precoding/beamforming matrix that minimizes the interference from the other K WTRUs 102-2, 102-3 ... 102-K. From the perspective of the first WTRU 102-1, the other WTRUs (e.g., WTRU 102-2, 102-3 ... WTRU 102-K) may be considered as a single equivalent WTRU 102-2' to simplify the notation.

The received signal at the AP/eNB 620 may be as given in Equation 7 as follows:

$$y = \Sigma_{i=1}^{2} H_i W_i s_i + z \qquad (7)$$

Singular Value Decomposition (SVD) of the channel matrices may be $H_i = U_i \Lambda_i V_i^\dagger$, i=1, 2. When the precoding/beamforming matrix/vector $W_2$ is given (e.g., is known and/or determined), for example, the WTRU 102-1 may determine its precoding matrix with an assistance from the AP/eNB 620.

As a first representative procedure, if the AP/eNB 620 sends a quantized or unquantized version of $H_2W_2$ to the WTRU 102-1, the WTRU 102-1 may choose and/or determine its precoding/beamforming matrix $W_1$ such that the column space $H_1W_1$ is orthogonal to the column space of $H_2W_2$ and the AP/eNB 620 may separate (e.g., may easily separate) the two signals by projecting the received signal vector to the two orthogonal column spaces, separately. It is contemplated that the precoding/beamforming matrix $W_1$ chosen as such and $V_1$ in the SVD may not be identical, while in a conventional LTE/LTE-A system they are identical. The WTRU 102-1 may know or may determine channel matrix $H_1$ through explicit (and/or implicit) feedback from the AP/eNB 620 or by using channel reciprocity.

As a second representative procedure, the AP/eNB 620 may choose and/or determine the column i of the column space $H_2W_2$ with the largest norm, and may send i to the WTRU 102-1. The WTRU 102-1 may attempt and/or may try to avoid using the direction represented by i. For example, the WTRU 102-1 may chooses and/or determine precoding/beamforming matrix $W_1$ such that the column space of $H_1W_1$ does not include i, for example: (1) to significantly reduce the signaling overhead because a vector instead of a matrix may be conveyed to the WTRU 102-1; and (2) to avoid a part (e.g., a significant part) of the mutual interference.

As a third representative procedure, the AP/eNB 620 may choose and/or determine the column i of the column space $H_2W_2$ with the least norm, and may send i to the WTRU 102-1. The WTRU 102-1 may attempt and/or try to use the direction represented by i. For example, the WTRU 102-1 may choose and/or determine the precoding/beamforming matrix $W_1$ such that the column space of $H_1W_1$ may include i.

Representative Procedures Using a Multi-Spatial-Stream Transmission with a Double Codebook The precoding/beamforming matrix may consist of or include, for example, two parts. The first part may capture (e.g. may indicate and/or track) long-term and/or wide-band behavior of the channel and the second part may capture (e.g. may indicate and/or track) short-term and/or narrow-band behavior of the channel. The signal received at the AP/eNB 620 may be given by Equation 8 as follows:

$$y = \Sigma_{i=1}^{2} H_i W_i^{LT} W_i^{ST} s_i + z \qquad (8)$$

where LT stands for long-term, and ST stands for short-term. Although the precoding/beamforming matrix may include two parts, any number of parts is possible. It is contemplated that this problem associated with a dual codebook for interference management/reduction can be reduced to the single codebook problem if a new channel $G_i := H_i W_i^{LT}$ is defined. For example, the new channel may be $G_i$ and the new precoding matrix may be $W_i^{ST}$. The solution for the single codebook case may be used to solve this problem. The network operation may include any of: (1) the AP/eNB 620 sending $H_2 W_2^{LT} W_2^{ST}$ to WTRU 102-1 and the WTRU 102-1 determining the ST precoding/beamforming matrix $W_2^{ST}$ (e.g., the best or optimum $W_2^{ST}$) (for example, the ST precoding/beamforming matrix $W_2^{LT}$ may be obtained through feedback from the AP/eNB 620 and/or by local measurement based on channel reciprocity); (2) the AP/eNB 620 may send $H_2 W_2^{LT} W_2^{ST}$ to the WTRU 102-1 and the WTRU 102-1 may determine the LT precoding/beamforming matrix $W_2^{LT}$ (e.g., the best or optimum $W_2^{LT}$) The ST precoding/beamforming matrix $W_2^{ST}$ may be obtained through feedback from the AP/eNB 620; and/or (3) the AP/eNB 620 may send the column of $H_2 W_2^{LT} W_2^{ST}$ with a particular norm (e.g., the largest norm) to the WTRU 102-1 and the WTRU 102-1 may determine the ST precoding/beamforming matrix $W_2^{ST}$ (e.g., the best or optimum $W_2^{ST}$). The LT precoding/beamforming matrix $W_2^{LT}$ may be obtained through feedback from the AP/eNB 620 and/or by local measurement based on the channel reciprocity.

Representative WTRU-Aided and eNB-Centric Procedures

FIG. 9 is a diagram illustrating a representative WTRU-aided interference coordination procedure.

Referring to FIG. 9, in a multiuser environment, the WTRUs (e.g., WTRU 102-1 and/or WTRU 102-2) may provide interference related information to manage intra-WTRU interference. Certain representative procedures may include any of the following:

(1) the WTRUs 102 (e.g., one or more or each WTRU) may estimate the UL channel by using (e.g., relying on) reciprocity of the channel. For example, a WTRU 102-1 may perform DL channel measurements that, for example, may be available from the DL reference signals (RSs). In TDD, it is contemplated that the transpose of the estimated DL channel may be an estimate of the UL channel. For FDD, depending on the frequency difference between or of the UL and DL, the estimated DL channel may be an estimate of the UL channel with or without additional corrections (e.g., in certain representative embodiments, one or more additional correction factors may be appropriate and/or needed).

(2) Given the estimated UL channel, the WTRU 102-1 may select a set of precoders (e.g., one or more precoders) and may convey (e.g., provide or indicate) the set of precoders to the AP/eNB 620. In certain representative embodiments, the set of precoders may be selected from predetermined precoders and the WTRU 102 may provide an index or indices to the selected predetermined precoder or precoders (e.g., a codebook value or codebook values). The selection mechanism and/or procedure may be based on one or more performance measures, such as a signal-to-noise (SNR) ratio, a signal-to-interference (SNI) ratio, other noise measurements, and/or capacity measurements, among others. The set of precoders selected and/or reported may be or may include a best precoder and/or a worst precoder for achieving an intended criteria or criterion.

(3) The AP/eNB 620 may receive, store and/or collect the reported sets of precoders (and/or indications or codebook values associated with the reported precoders) from one or more WTRUs 102 (e.g., all of the WTRUs 102-1 and 102-2 that the AP/eNB 620 is in communication with), and may analyze the interference and the scheduling requirements of the WTRUs 102. The AP/eNB 620 may include the information about the UL channels that the AP/eNB 620 has observed from UL SRS signals (e.g., if available).

(4) The AP/eNB 620 may choose a precoder for the WTRU 102 (e.g., each WTRU 102-1 and 102-2) based on the reported set of precoders. The criteria or criterion (e.g., the basic criteria) may be to reduce and/or minimize the cross interference for the UL transmissions from multiple WTRUs 102. On condition that the reported set of precoders is the best set of precoders (e.g., based on one or more rules and/or criteria), the recommended precoder set from the WTRU 102-1 may be referred to as $\{W_{1i}\}$ and the recommended precoder set from the WTRU 102-2 may be referred to as $\{W_{2j}\}$. The AP/eNB 620 may choose i and j such that $\|(H_1 W_{1i})^\dagger (H_2 W_{2j})\|$ may be minimized, substantially minimized and/or reduced, where may stand for the Frobenius norm.

Representative Procedures for UL MU-MIMO Based on Precoded Sounding Reference Signal In certain representative embodiments, the WTRU 102 may use a sounding reference signal (SRS) that may be precoded with a precoding matrix computed (e.g., determined) and/or obtained by the WTRU 102. The precoding/beamforming matrix may be composed of (e.g., may include) multiplication of sub-matrices including a precoding matrix used for digital beamforming, and/or a precoding matrix used for analog beamforming, among others.

The WTRU 102 may compute and/or determine the precoding/beamforming matrix for UL transmission using the signals transmitted in the DL. If the precoding/beamforming matrix, e.g., computed by the WTRU 102 is W, the precoded SRS may be given as y=Wt, where t may be the SRS. The AP/eNB 620 may receive precoded SRSs from multiple WTRUs 102, including WTRUs 102 in its own cell and the WTRUs 102 in neighboring cells, and may make scheduling decisions based on the precoded SRSs. The matrix used to precode the SRS may be determined (e.g., completely determined) by the WTRU 102 based on DL signals (e.g., DL reference signals), and/or the WTRU 102 may partially be determined by the WTRU 102 and partially by the AP/eNB 620. As an example, $W = W_1 W_2$, or $W = W_1$ where the precoding matrices follows the definitions disclosed herein. In certain representative embodiments, the WTRU 102 may: (1) determine a first precoding matrix for the SRS by using the DL signals, (2) precode the SRS with the determined matrix, (3) transmit the precoded SRS, and/or (4) receive a second precoding matrix determined by the AP/eNB 620, among others. The second precoding matrix may be transmitted by the AP/eNB 620 in a DL control channel or by using pilots precoded with this second precoding matrix. The WTRU 102 may form a composite precoding matrix to be used in data transmission such that the composite matrix may be a function of the first and second precoding/beamforming matrices. For example, the first precoding matrix determined by the WTRU 102 may be based on analog beamforming and may create a wide beam, and the second precoding matrix determined by the WTRU 102 may be based on digital beamforming and may cancel inter-user interference.

A representative WTRU procedure for a UL beamforming operation may be composed of or may include any of the following: (1) the WTRU 102 may estimate the UL channel based on the DL measurement (e.g., $\tilde{H}_{UL} \cong \tilde{H}_{DL}^T$); (2) the WTRU 102 may estimate the precoding/beamforming matrix/vector $W_1$ based on a channel-related measurement); (3) the WTRU 102 may transmit a SRS that may be precoded with the precoding/beamforming matrix/vector $W_1$; (4) the WTRU 102 may monitor the DL control channel; (5) the WTRU 102 may decode a related payload; (6) the WTRU 102 may determine the precoding matrix index (PMI) pertaining to the precoding/beamforming matrix/vector $W_2$, (e.g., (i) the decoded PMI may provide a further update on the channel direction to improve the accuracy of the beamforming, for example, the precoding/beamforming matrix/vector $W_2$ may be used and/or necessary to cancel multiuser interference, and/or (ii) the WTRU 102 may identify the precoding matrix/vector $W_2$ (e.g., the beamforming matrix) explicitly or implicitly from the decoded PMI); and/or (7) the WTRU 102 may beamform the transmit data vector as y=Wx, where W may be a function of the precoding matrixes/vectors $W_1$ and $W_2$, among others.

In certain representative embodiments, the precoding/beamforming matrix/vector $W_2$ may be used for data transmission (e.g., $y=W_2x$), which may be the case, for example, when the precoding/beamforming matrix/vector $W_1$ generates a wide beam and the precoding beamforming matrix/vector $W_2$ may be determined from the precoding/beamforming matrix/vector $W_1$ and may generate a narrower beam.

Representative Procedures for UL Beamformed Reciprocity

Channel reciprocity may be used to determine beamforming matrices for UL data transmission based on beamforming matrices used for the reception of DL data reception. For example: (1) the data to be transmitted in the UL direction may be precoded with or using the beamforming matrix that may be used at the receiver to receive the DL transmission; (2) the data to be transmitted in the UL direction may be precoded with a beamforming matrix that may generate a beam in the same direction as the beamforming matrix used at the receiver to receive the DL transmission; (3) UL SRS may be precoded with the same beamforming matrix used at the receiver to receive the DL transmission; (4) the methods and/or operations disclosed herein may be used to determine the precoding beamforming matrix used for UL data transmission; and/or (5) the widths of the beams generated at the WTRU to receive (e.g., using receive beamforming) and/or transmit (e.g., using transmit beamforming) may be different due to the differences in the transmit and the receive hardware. For example, transmit beams may be wider than receive beams. In this case, the beam used for UL data and/or SRS transmission may be derived based on the DL beam used for data reception. For example, the UL beam may be a beam in the same direction as the DL beam and with a wider beamwidth than the DL beam.

One of skill understands that channel reciprocity exists for both the uplink and the downlink such that the representative procedures/functions/methods/operations may implemented for either uplink communications or for downlink communications and with the roles/behaviors/operations of the uplink entity (e.g., the AP/eNB 620) and the downlink entity (e.g., the WTRU 102) reversed.

It is contemplated that the representative procedures/functions/methods/operations herein may be used in a adhoc network and/or in a direct peer to peer network such that the representative procedures/functions/methods/operations work between different WTRUs 102 or different AP/eNB 620.

Representative Procedures for Beamformed Transmit Diversity

FIG. 10A is a diagram illustrating beamformed transmit diversity procedures and operations for a single beam. FIG. 10B is a diagram illustrating beamformed transmit diversity procedures and operations for multiple beams of WTRUs and/or AP/eNBs. Referring to FIG. 10A, a WTRU 102-1 and/or a AP/eNB 620-1 may wirelessly communicate using UL and/or DL beams. Referring now to FIG. 10B, one or more WTRU 102-1 (and/or WTRU 102-2 not shown) and/or one or more AP/eNB 620-1 and 620-2 may wirelessly communicate using beams (e.g., UL and/or DL beams). An antenna (e.g., a multiple antenna) of a WTRU 102-1 (e.g., of a WTRU transmitter) may be used (e.g., may be exploited, included, and/or configured, etc.) for rank-1 transmit diversity transmission in conjunction with UL beamforming. In certain representative embodiments, performance of UL transmit diversity may be improved by creating a beam manifold (e.g., a properly directed beam manifold) for transmit diversity transmission. For example, a beam manifold may be used to generate any number of beams associated with another beam (e.g., an input beam, a first beam, and/or an original beam, etc.) by copying (e.g., duplicating, and/or multiplying, etc.) the other beam. It is contemplated that any number of transmit diversity modes may be possible. A transmit diversity mode may include a lack of any channel dimensional and/or directional information (e.g., a WTRU 102-1 may not have any channel dimensional and/or directional information for performing transmit diversity procedures). In such cases, a base beam manifold may be derived based on the channel reciprocity. The beamformed signal to be sent to an AP/eNB 620-1 (e.g., a transmit/receive point (TRP), an eNB, a gNB or AP) from one WTRU 102-1 may be denoted by Equation 9 as follows:

$$y = HW_1 W_2 x \qquad (9)$$

where precoding/beamforming matrices/vectors $W_1$ and $W_2$ may be based (e.g., are based, respectively) on a directional beam manifold and transmit diversity precoder.

In certain representative embodiments, a precoding/beamforming matrix/vector (e.g., a precoder) $W_1$ may be (e.g., derived) based on channel reciprocity. For example, in a TDD system, a precoder may be based on channel estimation (e.g., a direct channel estimation and/or a statistical channel estimation, among others) (e.g., using or based on a correlation matrix). In a FDD system, the precoder may be based on statistical channel estimation (e.g., only statistical channel estimation). In certain representative embodiments, a representative solution for precoder $W_1$ may be based on any number of Eigen directions of an estimated UL channel. In certain representative embodiments, a precoder may be based on DL channel estimation of one or multiple transmission and reception points (TRPs). Herein, the AP/eNB may be interchangeably used with a TRP and/or an AP. For example, a WTRU 102-1 may create a single UL beam or multiple UL beams pointed and/or directed to a single TRP 620-1 and/or multiple TRPs 620-1 and 620-2. In such cases, the WTRU 102-1 may create any number of UL beams simultaneously, opportunistically, and/or based on one or more prior coordinations.

In certain representative embodiments, a WTRU 102-1 may create a single UL beam or multiple UL beams pointed and/or directed to another WTRU 102-2 and/or multiple WTRUs 102-2 and 102-3. In such cases, the WTRU 102-1 may create any number of UL beams simultaneously, opportunistically, and/or based on one or more prior coordinations.

In certain representative embodiments, a TRP 620-1 may create a single UL beam or multiple UL beams pointed and/or directed to a WTRU 102-1 and/or multiple WTRUs 102-2 and 102-3. In such cases, the TRP 620-1 may create any number of UL beams simultaneously, opportunistically, and/or based on one or more prior coordinations.

In certain representative embodiments, a TRP 620-1 may create a single UL beam or multiple UL beams pointed and/or directed to another TRP 620 and/or multiple TRPs 620. In such cases, the TRP 620-1 may create any number of UL beams simultaneously, opportunistically, and/or based on one or more prior coordinations.

One of skill understands that transmit diversity may be provided by a mix of TRPs 620 and WTRUs 102 sharing beams (for example in an ad hoc network).

In certain representative embodiments, a WTRU 102 may use a precoder $W_p$. (e.g., an additional precoder $W_p$). The precoder $W_p$ may be used to mitigate impairments (e.g., channel estimation errors and/or interference, etc.). For example, the WTRU 102 may use the additional precoder $W_p$, as a controlled beam perturbation mechanism, for example, to lessen the impact of an impaired channel (e.g., impaired channel tracking). The beamformed signal to be sent to a network AP/eNB/TRP 620 from one WTRU 102 may be denoted by Equation 10 as follows:

$$y = H W_p W_1 W_2 x \tag{10}$$

In certain representative embodiments, a solution for precoder $W_p$ may be denoted by Equation 11 as follows:

$$W_p = U \epsilon V^* \tag{11}$$

where U, V are unitary matrices resulting from SVD decomposition of statistical estimation and/or direct estimation of the $\tilde{H}_{UL}$ and $\epsilon$ is a diagonal matrix containing and/or including perturbation elements. Perturbation elements may be chosen such that $\epsilon_i \ll d_i$, where $d_i$ may be eigenvalues associated with (e.g., resulting from) the SVD decomposition of, for example, statistical estimation and/or direct estimation of the $\tilde{H}_{UL}$.

In certain representative embodiments, a precoder $W_2$ may be selected (e.g., a choice for the precoder $W_2$ may be provided) based on transmit diversity schemes. For example, the precoder $W_2$ may be selected based on transmit diversity schemes (e.g., one or more rank-1 transmit diversity schemes) such as space-frequency block codes (SFBC) and/or cyclic-delay diversity (CDD), among others. In certain representative embodiments, a dimension, (e.g. an actual dimension, e.g., time, frequency and/or space) of the transmit diversity transmission may be less than a number (e.g., a total number) of transmitter antennas.

Representative Procedures for DL Channel Measurement with Asymmetric Interference at the WTRU FIG. 11 is a diagram illustrating sources of interference. Referring to FIG. 11, the network 600 may include the first cell 610-1 with the coverage area 615-1 and the second cell 610-2 with the coverage area 615-2. The AP/eNB 620-1 (for example, an eNB, gNB, and/or other RAN entity) may serve the first cell 610-1 and the AP/eNB 620-2 may serve the second cell 610-2. The first WTRU 102-1 may be in the coverage area 615-1 of the first cell 610-1. The second WTRU 102-2 may be in the coverage area 615-2 of the second cell 610-2. The WTRU 102-2 may transmit and/or send an interference signal (e.g., interference channel v). The validity of channel reciprocity may depend on the channel time/frequency coherency and the interference at the transmitter and/or at the receiver. For a non-synchronized system (e.g., TDD system), the sources of interference at the receiver (e.g., WTRU 102-1) may be from neighboring base stations (e.g., AP/eNB 620-2 and/or inter-cell WTRUs (e.g., 102-2). This may result in the DL such that Equation 12 is as follows:

$$\tilde{H}_{DL} \approx \tilde{H}_{DL}^{ni} + \tilde{I}_{intercell} \tag{12}$$

where $\tilde{H}_{DL}$ is the measured channel, $\tilde{H}_{DL}^{ni}$ is the no-interference DL channel and $\tilde{I}_{intercell}$ is the intercell interference. A transformation (e.g., simple transformation) of the measured DL channel may result in poor (e.g., extremely poor) UL performance. Operations, procedures and/or methods to reduce the effect of the inter-cell interference may include: (1) coordination to orthogonalize the measurement region (e.g., to limit the effect of interference). For example, adjacent base stations (e.g., AP/eNB 620-2) that have been identified as having an effect on a specific base-station (e.g., AP/eNB 620-1) may be silenced in a coordinated manner to enable measurement of the DL channel for multiple WTRUs 102-1 in a specific cell 610-1; and/or (2) creation of interference measurement resources to enable the measurement of the interference. For example, the instantaneous or second order statistics of $\tilde{I}_{intercell}$ may be measured.

The interference measurement may be used in one of the following ways: (1) for Matrix Interference Measurements (MIMs), the effective DL channel used to estimate the UL channel may be derived from $\tilde{H}_{DL}$ in the subspace orthogonal to the intercell interference, $\tilde{I}_{intercell}$ or the sub-space spanned by the eigenvectors of $R = E(\tilde{I}_{intercell} \tilde{I}_{intercell}^H)$; and/or (2) for Scalar Interference Measurements (SIMs), the interference energy may be captured as a scalar. Examples may include $\|\tilde{I}_{intercell}\|^2$.

The effective DL channel may be used, for example if (e.g., only if) the measured interference is below a certain threshold. It is contemplated that the UL channel used may be derived from multiple DL measurements.

Representative Procedures for UL Partial Channel Reciprocity Using a Codebook (e.g., with a Codebook)

A set of precoding vectors for transmission layers (e.g., each transmission layer and/or each transmission stream) may be used, configured, predefined, and/or predetermined, as a codebook. The precoding vectors (e.g., each precoding vector) in the codebook may be associated with an index. A precoding vector, a precoding matrix, a precoding weight, a precoder, a codeword, a beamforming vector, and a beam index may be interchangeably used but still consistent with this disclosure. For example, a transmit signal y at a WTRU transmitter may be expressed as $y = W_c x$, where $W_c$ may be a precoding vector and x may be a data symbol vector. A codebook may be defined as $W_c \in \{W_c^1, W_c^2, \ldots, W_c^N\}$, where N may be a number of precoding vectors in the codebook.

In certain representative embodiments, the precoding vector $W_c$ may be determined and/or selected by the WTRU 102 from within the codebook. For example, the WTRU 102 may determine the precoding vector associated with an index of the codebook (e.g., in the codebook) based on a DL channel which may be estimated, observed, derived, and/or measured from one or more DL signals. The DL signals may include any of: (1) a measurement reference signal (RS); (2) a demodulation RS (DRS); and/or (3) channel state information (CSI) transmitted from an AP/eNB 620, among others. Herein, the AP/eNB may be interchangeably used with an eNB, a gNB, a TRP and/or an AP.

The WTRU 102 may determine and/or select the precoding vector $W_c$ associated with and/or in the codebook based on one or more performance metrics which may include any of: (1) a throughput performance; (2) an SNR; and/or (3) a signal strength, among others.

The WTRU 102 may determine and/or select the precoding vector $W_c$ associated with and/or in the codebook based on the determined and/or used receiver beam for a DL signal reception. For example, the WTRU 102 may receive the DL signal with a determined receiver beam (and/or a receiver beam index) within a set of receiver beams and the precoding vector $W_c$ may be determined based on the receiver beam determined and/or used.

The WTRU 102 may determine and/or select the precoding vector $W_c$ associated with and/or in the codebook based on a CSI provided by the AP/eNB 620 and/or a DL channel. For example, the CSI may be provided by the AP/eNB 620 and the CSI may be used to determine a subset of precoding vectors associated with in the codebook. The WTRU 102 may select the precoding vector $W_c$ within the determined subset of precoding vectors based on the DL channel estimated from the DL signal. In certain representative embodiments, the WTRU 102 may determine a subset of precoding vectors associated with and/or in the codebook based on the DL channel estimated from the DL signal. The WTRU 102 may determine the precoding vector $W_c$ within a subset of precoding vectors based on the CSI provided by the AP/eNB 620. The CSI may include any of: (1) interference related information including one or more precoding vectors (for example, a WTRU 102 may not use, may not select, and/or or may not determine a precoding vector which may be indicated in the interference related information); (2) beam related information including one or more beam directions (for example, the WTRU 102 may not use, may not select, and/or may not determine a beam index (and/or a beam direction) which may be indicated in the beam related information)); and/or (3) a UL channel measured from a UL signal, among others.

The precoding vector $W_c$ may be determined, used, and/or constructed by one or more component precoding vectors. For example, if $W_c=W_1W_2$, precoder $W_1$ and precoder $W_2$ may be component precoders. One or more of the following may apply: (1) the component precoders (e.g., each component precoder) may be selected and/or determined from its associated codebook; (2) the first component precoder (e.g., $W_1$) may be determined by a network entity (e.g., the AP/eNB 620, a core network entity or another network entity) and/or a second component precoder (e.g., $W_2$) may be determined by the WTRU 102; (3) the first component precoder $W_1$ may be determined based on a first type of information (e.g., the CSI and/or information associated with the channel state) and/or a second component precoder $W_2$ may be determined based on a second type of information (e.g., information associated with the DL channel); (4) the first component precoder $W_1$ may be used, indicated, and/or determined in a long-term manner and the second component precoder $W_2$ may be used, indicated, and/or determined in a short-term manner (e.g., the first component precoder $W_1$ may be based on a longer term criteria than the second component precoder $W_2$); (5) the first component precoder $W_1$ may be used, indicated, and/or determined in a wideband manner and the second component precoder $W_2$ may be used, indicated, or determined in a sub-band manner (e.g., the first component precoder $W_1$ may be based on a wider bandwidth criteria than the second component precoder $W_2$; and/or (6) a first component precoder may be $W_1$ and a second component precoder may be $W_2$, or vice versa, among others.

The determined precoding vector $W_c$ associated with and/or in the codebook may be indicated implicitly or explicitly to the network 600 and/or the AP/eNB 620. The determined precoding vector index may be explicitly signaled in an associated UL control signal. For example, the associated UL control signal may be a physical UL control channel (e.g., the PUCCH).

The determined precoding vector index may be implicitly indicated based on one or more parameters of an UL DM-RS. For example, one or more orthogonal DM-RSs (e.g., cyclic shifts) may be used and one of the orthogonal DM-RSs (e.g., a cyclic shift) may be determined based on the determined precoding vector.

For example, the precoding vector $W_c$ may be determined by a network entity (e.g., the AP/eNB 620) and may be indicated to the WTRU 102. The WTRU 102 may report, indicate, and/or provide assist information for the precoding vector $W_c$ determination. For example, a $W_c=W_1W_2$ precoding structure may be used and partial information of the precoding vector $W_c$ (e.g., the precoder $W_1$ and/or the precoder $W_2$) may be reported, indicated, or provided by the WTRU 102. One or more of the following may apply: (1) the first component precoder and the second component precoder may be used to determine the precoding vector $W_c$; (2) the first component precoder may be determined based on the WTRU 102 reporting (for example, an index of the precoding vector for a first component precoder may be signaled, or reported from the WTRU 102); and/or (3) the second component precoder may be determined based on an UL channel estimated, measured, and/or derived from an UL reference signal (e.g., sounding reference signal (SRS).

Although the precoding vector $W_c$ is shown as a function of two component precoders (e.g., first and second component precoders), it is contemplated that the precoding vector $W_c$ may be a function of any number of component precoders. For example, the precoding vector may be based on three component vectors that may be determined by more than two network and/or end user devices.

Representative Procedure of AP and/or eNB for Overriding WTRU Autonomous UL Precoding Determination The WTRU 102 may determine one or more UL precoding vectors for an UL signal transmission. For example, one or more transmit antennas (and/or antenna ports) may be used for a UL transmission at the WTRU transmitter. One or more precoding vectors for the UL transmission may be determined by the WTRU 102 based on a channel estimated, measured, and/or derived from a DL signal. The WTRU autonomous determination of one or more precoding vectors for an UL transmission may result in co-channel interference which may not be controlled by the AP/eNB 620. An AP/eNB scheduler may be able to override and/or may override the WTRU determination of one or more precoders, if needed and/or if appropriate.

In one example, an indication may be used to indicate whether the WTRU 102 may use and/or may need to use a precoding vector indicated and/or instructed by the AP/eNB 620 or another network entity. The WTRU 102 may determine the precoding vector for the UL signal transmission. For example, the WTRU 102 may use the precoding vector indicated from the AP/eNB 620 for the UL signal transmission in a first mode of operation and the WTRU 102 may determine a precoding vector for the UL signal transmission in a second mode of operation.

The first mode of operation may be referred to as a fallback UL transmission mode. For example, in the first mode of operation: (1) the precoding vector for the UL signal transmission may be dynamically indicated in an associated DCI. In certain representative embodiments, the precoding vector may be preconfigured via higher layer signaling and may be indicated and/or instructed by the AP/eNB 620 to use (e.g., for the WTRU 102 to use) the preconfigured precoding vector; and/or (2) the precoding vector for the UL signal transmission may be determined randomly based on a time/frequency resource index (for example, precoder cycling may be used in this operation mode).

The second mode of operation may be referred to as a standard UL transmission mode or a normal UL transmission mode. For example, in the second mode of operation, the precoding vector for the UL signal transmission may be determined by the WTRU 102 based on a DL channel estimated from a measurement reference signal and/or a CSI provided by the AP/eNB 620.

The mode of operation may be indicated, determined, and/or selected based on any of the following: (1) DL control information (DCI) (e.g., one or more DCI transmissions) may be used to indicate the mode of operation (for example, a first DCI format may be used for a first operation mode and a second DCI format may be used for a second operation mode); (2) a single DCI format with a different RNTI may be used to indicate the mode of operation (for example, a first RNTI for the DCI format may be used for (e.g., to indicate) the first operation mode and a second RNTI for the DCI format may be used for (e.g., to indicate) the second operation mode) (for example, (i) the DCI contents for the first RNTI and the second RNTI may be different)). As another example, a precoding matrix indication (PMI) field may exist for the first RNTI and no PMI field may exist for the second RNTI and/or (ii) a specific field may be interpreted differently as a function of the RNTI (for example, a PMI field may be used to indicate a precoding vector for an UL signal transmission when or on condition that the first RNTI is used for the DCI format and/or the PMI field may be used to indicate assist information for a precoding vector determination when or under the condition that the second RNTI is used for the DCI format); and/or (3) a bit field in an associated DCI for an UL signal transmission may be used to indicate the mode of operation, among others.

A DL control channel search space partitioning may be used to indicate the mode of operation. For example, a DL control channel search space may be partitioned into two or more partitions. A first partition of the search space may be used to indicate the first mode of operation and/or a second partition of search space may be used to indicate the second mode of operation.

In another representative embodiment, the precoding vector may be indicated by the AP/eNB 620 for a frequency non-selective precoding and one or more precoding vectors may be determined by the WTRU 102 for a frequency selective precoding. The frequency non-selective precoding may use a single precoding vector for an UL signal transmission within a certain time and frequency window (e.g., one or more TTIs). A frequency selective precoding may use one or more precoding vectors for an UL signal transmission. The precoding vector for a first time/frequency resource and for a second time/frequency resource scheduled for the WTRU 102 may be different. For example, a first sub-band and a second sub-band for an UL data transmission in a TTI may have different precoding vectors. The frequency non-selective precoding may be interchangeably used with a fallback UL transmission mode and the frequency selective precoding may be interchangeably used with a standard or normal UL transmission mode, or vice versa.

Representative Hybrid WTRU MIMO Procedures

In hybrid WTRU MIMO procedures, the multiple antenna scheme/operation/procedures and corresponding antenna weights may be jointly decided and/or determined by the AP/eNB 620 (e.g., the gNB) and WTRU 102 (e.g., both the gNB 620 and the WTRU).

In certain examples, the gNB 620 may decide on and/or determine a specific multiple antenna scheme/operation and the WTRU 102 may decide on and/or determine a specific set of antenna weights to be used based on that determined scheme/operation. For example, the gNB 620 may provide generalized constraints within which the WTRU 102 may pick a particular and/or specialized scheme. The WTRU 102 may select the specific scheme and may indicate the scheme used during transmission. As an example, the gNB 620 may specify/indicate that the WTRU 102 should, may or is to transmit using an antenna diversity scheme (e.g., CDD or STBC) with a specified number of streams.

As another example, the gNB 620 may specify/indicate that the WTRU 102 should, may or is to transmit using a specific rank and the WTRU 102 may select the specific scheme within that constraint (e.g., associated with the specific rank specified and/or indicated). As an example, the gNB 620 may be setting up an UL multiuser MIMO transmission and may request that the WTRU 102 keep and/or constrain the WTRU 102 to keep its transmission within a predefined subspace.

In certain examples, the gNB 620 may decide on and/or determine a set of wideband or sub-band based weights that the WTRU 102 may use and the WTRU 102 may select a specific weight to use. As an example, the gNB 620 may indicate and/or signal a sub-codebook or a specific set of codewords that the WTRU 102 may use for transmission (e.g., UL transmission). The WTRU 102 may select one of the codewords in the codebook for the transmission. The WTRU 102 may select (e.g., optimally select) the codeword based on a specific criterion, cycle through the codewords in a pre-determined manner and/or randomly select one of the codewords from the codebook.

For example, the gNB 620 may decide on and/or determine a wideband antenna weight (and/or a set of antenna weights) for the WTRU 102 to use. The WTRU 102 may decide on and/or determine one or more sub-bands (e.g., additional sub-bands) and/or resource element weights that may optimize the performance of the WTRU 102 given the gNB 620 directed antenna weight or antenna weights.

In certain examples, it is contemplated that one or more wideband (e.g., common) precoders and/or one or more sub-band/RE specific precoders may be implemented. The RS may be precoded with a wideband (e.g., common) precoder and, for example, may allow for a smoothed channel estimation at or by the gNB 620. The one or more wideband (e.g., common) precoders may be selected by the gNB 620, cycled through or randomly selected while the one or more sub-band/RE based precoders may be selected by the WTRU 102. The WTRU 102 may use a non-precoded RS or a common RS precoder across one or more frequency bands in addition to the precoder on the data resources.

In representative autonomous WTRU-MIMO procedures, the WTRU 102 may estimate the channel based on DL reference signal transmission from the gNB 620, for example by assuming and/or based on channel reciprocity. The DL reference signals are to be or may need to be non-precoded (or precoded with the same beam that the gNB 620 will use for reception).

In representative hybrid WTRU MIMO procedures, the WTRU 102 is to have and/or may need to have a level of (e.g., some level of) channel knowledge and may use channel reciprocity, as well.

Representative Procedures for WTRU Calibration Capability Indication

The WTRU 102 may use reciprocity-based measurements based on its state of the calibration. If a WTRU 102 is not calibrated properly, the WTRU 102 may fall back to the CSI-based operation and/or may need to or may desire to fall back on the CSI-based operation. The calibration state of the WTRU 102 may be communicated to the AP/eNB 620 in a number of different procedures, operations and/or ways.

In one example, the WTRU 102 may declare the calibration state through RRC signaling. For example, the information may be carried as an independent field in the RRC ueCapabilitynformation message. This may be in a form of a single bit flag indicating the calibration status.

In another example, the WTRU state of calibration may be implied by a field (e.g., the WTRU-category field or ue-category field that is communicated through or via the RRC ueCapabilitynformation message. Certain WTRU classes may be considered calibrated (e.g., may always be considered calibrated).

In a further example, the WTRU 102 may indicate its calibration state dynamically by transmission of a specific signal. The calibration status information may be carried by specific parameters, attributes, and/or resources of the UL signal (e.g., using specific parameters, attributes, and/or resources of the UL signal, such as phase, seed, and/or root sequence, among others). For example, when using a ZC sequence for UL DMRS signaling, SRS signaling and/or PRACH signaling, the information may be indicated by choice of a proper cyclic shift. In another example, the information may be derived from a subcarrier location of the UL signal, such as odd/even. In certain representative embodiments, the calibration status information may be carried directly by a field in a UCI message.

FIG. 12 is a diagram illustrating a representative method implemented by a WTRU.

Referring to FIG. 12, the representative method 1200 may include, at block 1210, the WTRU 102 determining a first beamforming matrix. At block 1220, the WTRU 102 may send to a network entity 620 an indication of the first beamforming matrix. At block 1230, the WTRU 102 may receive from the network entity 620 an indication of a second beamforming matrix determined by the network entity 620 from at least the first beamforming matrix for beamforming data for transmission. For example, the WTRU may beamform the data for transmission using the first and second beamforming matrices.

FIG. 13 is a diagram illustrating another representative method implemented by a WTRU.

Referring to FIG. 13, the representative method 1300 may include, at block 1310, the WTRU 102 determining an UL channel estimate based on a DL measurement of a DL channel corresponding to the UL channel. At block 1320, the WTRU 102 may determine first beamforming information based on the determined UL channel. At block 1330, the WTRU 102 may receive from a network entity 620 for beamforming data for transmission, second beamforming information, the second beamforming information being: (1) based on the first beamforming information sent by the WTRU 102 to the network entity 620 or (2) inferred by the network entity using UL channel-related information.

In certain representative embodiments, the WTRU 102 may communicate to a network entity 620 the determined first beamforming information.

In certain representative embodiments, the WTRU 102 may beamform the data for transmission using the first and second beamforming matrices.

In certain representative embodiments, the first beamforming information may be inferred by the network entity 620 which may eliminate a communication of the first beamforming information to the network entity 620.

In certain representative embodiments, the first beamforming information may be inferred at the network entity 620 based on UL channel statistics.

In certain representative embodiments, the WTRU 102 may: (1) derive the DL channel estimate from DL reference symbols or demodulation reference symbols embedded in DL data and/or control transmissions; (2) determine a linear transformation or a non-linear transformation used to determine the UL channel estimate from the DL channel estimate; and/or (3) generate the UL channel estimate from the DL channel estimate and the determined transformation.

In certain representative embodiments, the WTRU 102 may derive the first beamforming information from the UL channel estimate or based on all or a subset of eigenvectors of a covariance matrix of the UL channel estimate.

In certain representative embodiments, the WTRU 102 may send any of: one or more precoded reference signals or a representation of a beamforming matrix and/or a beamforming vector.

In certain representative embodiments, the representation of the beamforming matrix or the beamforming vector may include any of: (1) a matrix index (MI); (2) a compressed set of values for the beamforming matrix or the beamforming vector; and/or (3) a differential MI or vector indicating a difference between a vector previously sent by the WTRU 102 to the network entity 620 across frequency and/or time.

In certain representative embodiments, the WTRU 102 may receive the second beamforming information periodically or aperiodically such that the second beamforming information may be updated.

In certain representative embodiments, the first beamforming information may track one of: (1) channel variations in time and/or frequency lower than a threshold; or (2) the channel variations in time and/or frequency higher than the threshold and the second beamforming information may track the other one of: (1) the channel variations in time and/or frequency lower than the threshold; or (2) the channel variations in time and/or frequency higher than the threshold.

In certain representative embodiments, the WTRU 102 may measure an angle of arrival (AOA) of a signal in the DL, and may determine the first beamforming information using the measured AOA.

In certain representative embodiments, the WTRU 102 may determine a precoding vector based on: any of: (1) a receiver beam or a receiver beam index for a DL signal reception; and/or (2) channel state information (CSI), for example, provided by the network entity 620 and/or via a DL channel.

In certain representative embodiments, the CSI may include any of: (1) interference related information (2) beam related information; and/or (3) a UL channel related information measured from a UL signal.

In certain representative embodiments, the WTRU 102 may combine a first component precoder associated with information obtained from the network entity 620 with a second component precoder determined by the WTRU 102.

In certain representative embodiments, the first component precoder may be selected based on one of: (1) a criterion associated with a longer timeframe than a criterion of the second component precoder; and/or (2) a corresponding bandwidth that is wider than a correspond bandwidth of the second component precoder.

FIG. 14 is a diagram illustrating a further representative method implemented by a WTRU.

Referring to FIG. 14, the representative method 1400 may include, at block 1410, the WTRU 102 determining an UL channel estimate based on a DL measurement of a DL channel corresponding to the UL channel. At block 1420, the WTRU 102 may receive and decode a payload pertaining to an interference channel associated with an interference direction. At block 1430, the WTRU 102 may determine a beamforming matrix index from the decoded payload. At block 1440, the WTRU 102 may determine a beamforming matrix and/or a beamforming vector based on the estimated UL channel and the interference channel such that the interference channel lies in a null space of the beamforming matrix or the beamforming vector. At block 1450, the WTRU 102 may beamform data for transmission using the determined beamforming matrix and/or the determined beamforming vector.

In certain representative embodiments, the WTRU 102 may receive via a network entity 620, the payload including beamforming information associated with the interference channel. For example, the interference channel may be a single interference channel or a composite of a plurality of interference channels.

In certain representative embodiments, the WTRU 102 may determine the beamforming matrix and/or the beamforming vector to orthogonalize a column space of the beamforming matrix and/or the beamforming vector to a column space of a matrix or a vector indicated by the included beamforming information.

In certain representative embodiments, the WTRU 102 may receive via a network entity 620, information indicating a direction of an interference channel and may determine the beamforming matrix and/or the beamforming vector to avoid or substantially avoid using the indicated direction.

In certain representative embodiments, the WTRU 102 may receive via a network entity 620, information indicating a direction and may determine the beamforming matrix and/or the beamforming vector to use the indicated direction.

FIG. 15 is a diagram illustrating an additional representative method implemented by a WTRU.

Referring to FIG. 15, the representative method 1500 may include, at block 1510, the WTRU 102 determining an UL channel estimate based on a DL measurement of a DL channel corresponding to the UL channel. At block 1520, the WTRU 102 may communicate to a network entity 620, a SRS that is precoded using the first beamforming information. At block 1530, the WTRU 102 may receive from the network entity 620 a payload. At block 1540, the WTRU 102 may determine from the payload a matrix index pertaining to second beamforming information. At block 1550, the WTRU 102 may identify the second beamforming information from the determined matrix index. At block 1560, the WTRU 102 may beamform data for transmission using the first and second beamforming information.

In certain representative embodiments, the WTRU 102 may monitor for and may decode the matrix index.

In certain representative embodiments, the receiving of the second beamforming information may occur periodically or aperiodically such that the second beamforming information is updated.

FIG. 16 is a diagram illustrating a yet further representative method implemented by a WTRU.

Referring to FIG. 16, the representative method 1600 may include, at block 1610, the WTRU 102 determining an UL channel estimate based on a DL measurement of a DL channel corresponding to the UL channel. At block 1620, the WTRU 102 may send to an Access Point (AP) 620 the set of recommended precoders or one or more codebook values representing the set of recommended precoders. At block 1630, the WTRU 102 may receive from the AP, any of: (1) an indication whether or not the recommended precoders determined by the WTRU is to be used for UL communication with the AP; (2) one or more codebook values indicating one or more selected precoders for the UL communication with the AP; and/or (3) the set of selected precoders for the UL communication with the AP.

FIG. 17 is a diagram illustrating a yet additional representative method implemented by a WTRU.

Referring to FIG. 17, the representative method 1700 may include, at block 1710, the WTRU 102 determining an UL channel estimate based on a DL measurement of a DL channel corresponding to the UL channel. At block 1720, the WTRU 102 may select one or more precoders based on the determined estimate of the UL channel. At block 1730, the WTRU 102 may receive from the AP, an override indication to override the selected one or more precoders. For example, the override indication may indicate whether the WTRU 102 may or is to use a precoding vector indicated by the AP that is associated with a first mode of operation for UL signal transmission or whether the WTRU 102 may or is to use a precoding vector set by the WTRU that is associated with a second mode of operation for the UL signal transmission. In the first mode of operation, the precoding vector for the UL signal transmission may be any of: (1) dynamically indicated in downlink control information; (2) preconfigured via higher layer signaling; or (3) determined randomly based on a time/frequency resource index. In the second mode of operation, the precoding vector for the UL signal transmission may be determined by the WTRU 102 based on a DL channel estimated from a measurement reference signal and/or channel state information provided by the AP 620.

In certain representative embodiments, a mode of operation may be indicated by any of: (1) downlink control information (DCI) such that a first DCI format may indicate a first operation mode and a second DCI format may indicate a second operation mode; (2) different RNTIs such that a first RNTI for a single DCI format may indicate the first operation mode and a second RNTI for the single DCI format may indicate the second operation mode; and/or (3) a bit field in the DCI for an UL signal transmission may indicate the mode of operation.

In certain representative embodiments, the precoding vector may be indicated by the AP 620 for a frequency non-selective precoding and one or more precoding vectors may be determined by the WTRU 102 for a frequency selective precoding.

FIG. 18 is a diagram illustrating a yet another representative method implemented by a WTRU.

Referring to FIG. 18, the representative method 1800 may include, at block 1810, the WTRU 102 determining whether to estimate an UL channel using channel reciprocity based on a state of calibration of the WTRU. At block 1820, on condition that the state of calibration is sufficient to use the channel reciprocity, the WTRU 102 may determine the UL channel estimate based on a DL measurement of a DL channel corresponding to the UL channel. At block 1830, on condition that the state of calibration is insufficient to use the channel reciprocity, the WTRU 102 may determine the UL channel estimate using channel state information. At block 1840, the WTRU 102 may determine one or more precoding vectors for UL communication with an AP 620 based on the determined UL channel estimate. For example, the state of calibration may be a single bit flag carried in an RRC message.

FIG. 19 is a diagram illustrating a representative method implemented by a NE. Referring to FIG. 19, the representative method 1900 may include, at block 1910, for each respective WTRU 102 of a plurality of WTRUs 102: the NE 620 may receive or may infer from the respective WTRU 102 first beamforming information; determine, based on the received or inferred first beamforming information, second beamforming information associated with the respective WTRU 102; and send to the respective WTRU 102, the second beamforming information.

FIG. 20 is a diagram illustrating another representative method implemented by a NE. Referring to FIG. 20, the representative method 2000 may include, at block 2010, for each respective WTRU 102-1 of a plurality of WTRUs 102-1, 102-2 . . . 102-K: the NE 620 may receive beamforming information; determine, based on the received beamforming information, composite interference channel information associated with the WTRUs 102-2 . . . 102-K other than the respective WTRU 102-1; and send to the respective WTRU 102-1, the composite interference channel information. For example, the composite interference channel information may indicate or may include any of: (1) a first direction to be included for beamforming of the respective WTRU 102-1; (2) a second direction to be avoided for beamforming of the respective WTRU 102-1; and/or (3) a matrix or a vector to orthogonalize a column space of a second beamforming matrix or a second beamforming vector to a column space of the indicated or included matrix or vector.

FIG. 21 is a diagram illustrating a further representative method implemented by a NE.

Referring to FIG. 21, the representative method 2100 may include, at block 2110, for each respective WTRU 102-1 of a plurality of WTRUs 102-1, 102-2 . . . 102-K: the NE 620 may receive from the respective WTRU 102-1, a SRS that is precoded using the first beamforming information; determine second beamforming information using at least the received precoded SRSs; and send to the respective WTRU 102, a payload including a matrix index pertaining to second beamforming information.

FIG. 22 is a diagram illustrating an additional representative method implemented by a NE. Referring to FIG. 22, the representative method 2200 may include, at block 2210, the NE 620 determining UL channel estimates based on UL measurements for a plurality of WTRUs 102. At block 2220, the NE 620 may receive from each respective WTRU 102-1, 102-2 . . . 102-K of the plurality of WTRUs 102 a set of recommended precoders or one or more codebook values representing the set of recommended precoders. At block 2230, the NE 620 may select at least one precoder for a respective WTRU 102-1 of the plurality of WTRUs 102 based on the received set of recommended precoders, for example to reduce or to minimize cross interference for the UL communication from the plurality of WTRUs 102.

At block 2240, the NE 620 may send any of: (1) an indication whether or not the recommended precoders determined by the WTRU 102 may be or is to be used for UL communication with the NE 620; (2) one or more codebook values indicating one or more selected precoders for the UL communication with the NE 620; and/or (3) the set of selected precoders for the UL communication with the NE 620.

In certain representative embodiments, the NE 620 may analyze any of interference and/or scheduling requirements of the plurality of WTRUs 102.

FIG. 23 is a diagram illustrating a further representative method implemented by a WTRU for a transmit diversity mode.

Referring to FIG. 23, the representative method 2300 may include, at block 2310, the WTRU 102 preconfiguring first precoding information for data communication in the transmit diversity mode with a NE 620.

At block 2320, the WTRU 102 may determine an estimate of an UL channel based on a DL measurement of a DL channel corresponding to the UL channel. At block 2330, the WTRU 102 may determine second precoding information based on the estimate of the UL channel. At block 2340, the WTRU 102 may data communicate with the NE 620 using the preconfigured first precoding information and the second precoding information. For example, the first precoding information may be any of: (1) static or semi-static information preconfigured in the WTRU 102; and/or (2) sent by the NE 620, as information for open-loop precoding of data for communication by the WTRU 102.

In certain representative embodiments, the first precoding information may be associated with one or more transmit diversity modes of the WTRU 102.

In certain representative embodiments, the WTRU 102 may transmit an UL transmission over a plurality of antennas 122. For example, a number of the antennas 122 may be greater than a dimension associated with the UL transmission.

In certain representative embodiments, the second precoding information may include information associated with beamforming: (1) for a TDD system and may be based on any of: a direct channel estimation and/or a statistical channel estimation; and/or (2) for a FDD system and may be based on the statistical channel estimation.

In certain representative embodiments, the second precoding information may be based on an Eigen direction of the estimate of the UL channel.

In certain representative embodiments, the first precoding information may be used by the WTRU 102 for one or more durations for which the WTRU 102 operates in the transmit diversity mode.

In certain representative embodiments, the WTRU 102 may generate a UL transmission using a beam manifold such that the beam manifold may be used for transmitting the UL transmission in more than one direction.

In certain representative embodiments, the WTRU 102 may determine third precoding information based on perturbation elements. For example, the third beamforming information may be based on a diagonal matrix e including the perturbation elements. The perturbation elements included in the diagonal matrix $\epsilon$ may be chosen such that $\epsilon_i \ll d_i$, where $d_i$ are eigenvalues resulting from singular value decomposition (SVD) of any of: a statistical channel estimation and/or a direct channel estimation.

In certain representative embodiments, the WTRU 102 may determine more than one estimate associated with more than one UL channel. The determined UL channels may be transmitted simultaneously, opportunistically, and/or based on prior coordination.

Figure 24:
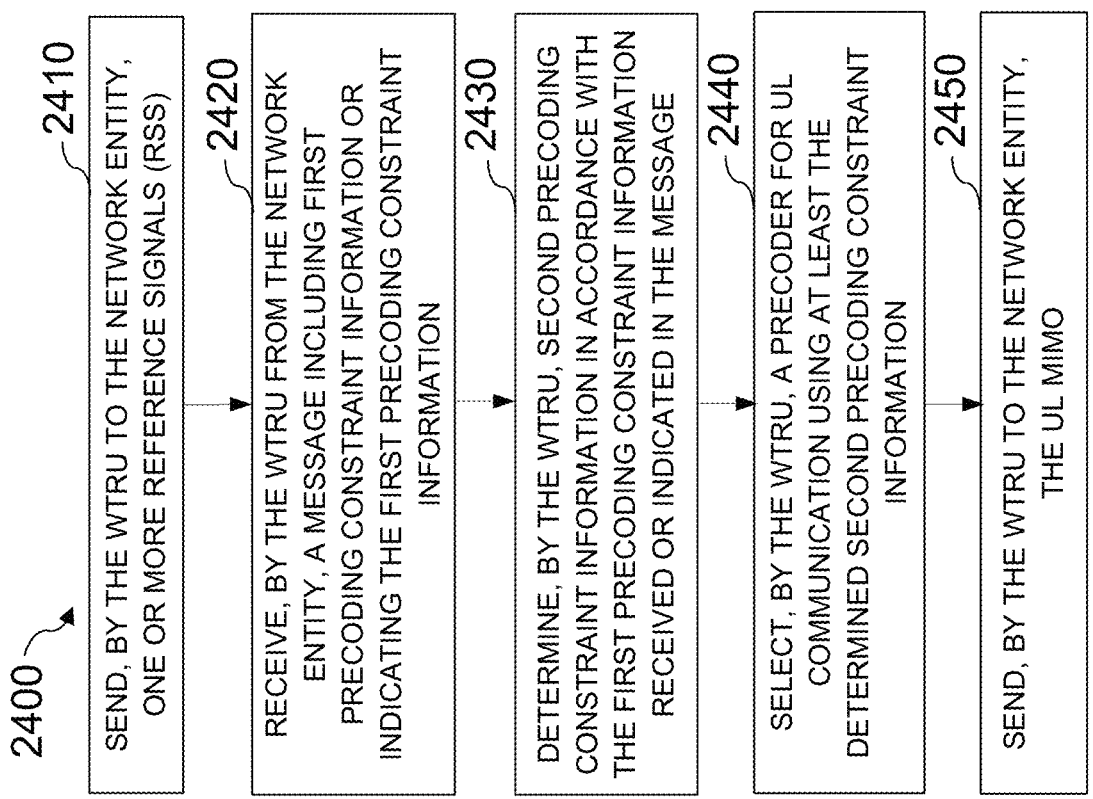
FIG. 24 is a diagram illustrating a representative method implemented by a WTRU to manage UL MIMO communication.

FIG. 24 is a diagram illustrating a representative method implemented by a WTRU to manage UL MIMO communication.

Referring to FIG. 24, the representative method 2400 may include, at block 2410, the WTRU 102 sending to the NE 620, one or more Reference Signals (RSs). At block 2420, the WTRU 102 may receive from the NE 620, a message including first precoding constraint information or indicating the first precoding constraint information. At block 2430, the WTRU 102 may determine second precoding constraint information in accordance with the first precoding constraint information received or indicated in the message. At block 2440, the WTRU 102 may select a precoder for UL communication using at least the determined second precoding constraint information. At block 2450, the WTRU 102 may send to the NE 620, the UL MIMO communication using the selected precoder.

In certain representative embodiments, the message may include information indicating any of: (1) a set of wideband antenna weights, (2) one or more sets of sub-band antenna weights, (3) a range of wideband antenna weights, and/or (4) one or more ranges of sub-band antenna weights, as the first precoding constraint information.

In certain representative embodiments, the WTRU 102 may select one or more particular antenna weights from among the antenna weights indicated in the message, as the second precoding constraint information.

In certain representative embodiments, the message may indicate or include codewords associated with a codebook or a specific set of codewords that the WTRU 102 is to select from for the UL MIMO communication, as the first precoding constraint information.

In certain representative embodiments, the WTRU 102 may determine the second precoding constraint information in accordance with the first precoding constraint information by any of: (1) selecting one of the codewords indicated or included based on a specific criterion, (2) selecting one of the codewords indicated or included by cycling through the codewords indicated or included in a pre-determined manner and/or (3) randomly selecting one of the codewords indicated or included.

In certain representative embodiments, the WTRU 102 may determine the second precoding constraint information in accordance with the first precoding constraint information by any of: (1) selecting one of the codewords indicated or included based on a specific criterion, (2) selecting one of the codewords indicated or included by cycling through the codewords indicated or included in a pre-determined manner and/or (3) randomly selecting one of the codewords indicated or included.

In certain representative embodiments, the message may include information indicating a wideband antenna weight and the WTRU 102 may determine one or more sub-band and/or resource element weights in accordance with the indicated wideband antenna weight.

In certain representative embodiments, the WTRU 102 may select one or more particular antenna weights from among the antenna weights indicated in the message, as the second precoding constraint information.

In certain representative embodiments, the WTRU 102 may determine antenna weights for the UL MIMO communication based on the first precoding constraint information and may select a precoder using the second precoding constraint information and the determined antenna weights.

In certain representative embodiments, the first precoding constraint information may include information indicating any of: (1) a specific multiple antenna scheme; (2) a transmission scheme; (3) a specified number of streams; (4) a subspace constraint indicating a subspace into which transmissions from the WTRU 102 are constrained; and/or (5) a rank. For example, the specific multiple antenna scheme may include any of: (1) a time diversity scheme; (2) a space diversity scheme; and/or (3 a frequency diversity scheme; (4) a polarization diversity scheme; (5) a multiuser diversity scheme; (6) a cooperative diversity scheme; (7) a Space-Time Block Code (STBC) scheme; and/or (8) a Cyclic Delay Diversity (CDD) scheme.

In certain representative embodiments, the message may be any of: (1) received over a downlink control channel; (2) received in an uplink grant and/or (3) received as control signaling.

In certain representative embodiments, the indication may be any of: (1) a codeword and/or (2) a precoding or beamforming matrix index (PMI).

In certain representative embodiments, the one or more Reference Signals (RSs) may be a multi-dimensional sounding RS. For example, the multi-dimensional sounding RS may have a dimensionality based on any of: (1) a number of transmit antennas of the WTRU; (2) characteristics of the transmit antennas of the WTRU 102 and/or (3) a number of effective transmit beams of the WTRU 102.

In certain representative embodiments, the WTRU 102 may receive from the NE 620, the one or more RS, as one or more feedback RSs and may estimate the channel using the one or more feedback RSs.

In certain representative embodiments, the one or more RSs may not be precoded or may be precoded with the same beam that the NE 620 will use for reception.

Figure 25:
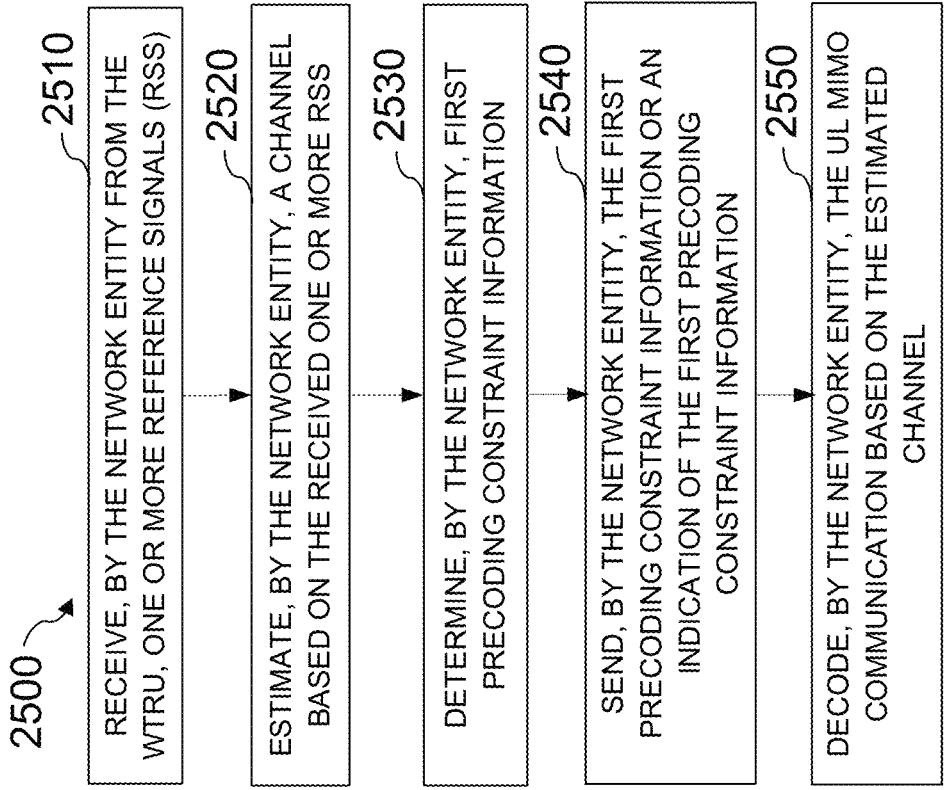
FIG. 25 is a diagram illustrating a representative method implemented by a NE for managing UL MIMO communication.

FIG. 25 is a diagram illustrating a representative method implemented by a NE for managing UL MIMO communication.

Referring to FIG. 25, the representative method 2500 may include, at block 2510, the NE 620 receiving, from the WTRU 102, one or more Reference Signals (RSs). At block 2520, the NE 620 may estimate a channel based on the received one or more RSs. At block 2530, the NE 620 may determine first precoding constraint information. At block 2540, the NE 620 may send to the WTRU 102 the first precoding constraint information or an indication of the first precoding constraint information. At block 2550, the NE 620 may decode the UL MIMO communication based on the estimated channel.

In certain representative embodiments, the NE 620 may send the indication any of: (1) over a downlink control channel; (2) in an uplink grant and/or (3) as control signaling.

In certain representative embodiments, the NE 620 may send the indication in any of: (1) a codeword and/or (2) in a precoding or beamforming matrix index (PMI).

In certain representative embodiments, the one or more Reference Signals (RSs) may be a multi-dimensional sounding RS. For example, the multi-dimensional sounding RS may have a dimensionality based on any of: (1) a number of transmit antennas of the WTRU 102; (2) characteristics of the transmit antennas of the WTRU 102; and/or (3) a number of effective transmit beams of the WTRU 102.

In certain representative embodiments, the first precoding constraint information may include information indicating any of: (1) a specific multiple antenna scheme; (2) a transmission scheme and a specified number of streams; (3) a subspace constraint indicating a subspace into which transmissions from the WTRU 102 are constrained; and/or (4) a rank.

In certain representative embodiments, the first precoding constraint information may include information indicating a set of wideband or sub-band based antenna weights and/or range of antenna weights.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a UE, WTRU, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any WTRU recited herein, are provided below with respect to FIGS. 1-5.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method of uplink (UL) transmission implemented by a Wireless Transmit/Receive Unit (WTRU) using a plurality of Sounding Reference Signals (SRSs), the method comprising:

measuring, by the WTRU, one or more downlink (DL) reference signals (RSs);
precoding, by the WTRU, the plurality of SRSs using first precoding information which is based on the measured one or more DL RSs;
transmitting, by the WTRU to a network entity, the plurality of SRSs that are precoded;
receiving, by the WTRU, Downlink Control Information (DCI) including an indicator indicating second precoding information based on the precoded SRSs;
precoding, by the WTRU, UL data using the indicated second precoding information; and
transmitting, by the WTRU, the UL data that is precoded using the indicated second precoding information.

2. The method of claim 1, wherein the transmitting of the SRSs that are precoded includes sending an indication to the network entity of a set of recommended precoders.

3. The method of claim 2, further comprising identifying, by the WTRU via the DCI, a subset of the recommended precoders sent as the indication to the network entity based on the indicator included in the DCI.

4. The method of claim 2, wherein the plurality of SRSs and the UL data are precoded differently.

5. The method of claim 1, wherein the indicator is an index to identify the second precoding information.

6. The method of claim 2, wherein the set of recommended precoders used to precode the plurality of the SRSs is determined by the WTRU based on the measured DL RSs.

7. The method of claim 3, wherein the subset of recommended precoders associated with the second precoding information and indicated by the indicator in the DCI is used to any of generate a beam: (1) in a particular direction; (2) to avoid or to substantially avoid an interference direction; (3) to cancel or to reduce interference between or among the WTRU and one or more further WTRUs; or (4) having a null space that corresponds to an interference direction associated with at least one other WTRU.

8. The method of claim 6, further comprising determining the first precoding information including determining a precoding vector or precoding matrix based on channel state information (CSI) RSs, as the measured DL RSs.

9. A Wireless Transmit/Receive Unit (WTRU) configured to transmit uplink (UL) data using a plurality of Sounding Reference Signals (SRSs), comprising:

a processor configured to:
measure one or more downlink (DL) reference signals (RSs), and
precode the plurality of SRSs using first precoding information which is based on the measured one or more DL RSs; and
a transceiver configured to:
transmit, to a network entity, the plurality of SRSs that are precoded, and
receive Downlink Control Information (DCI) including an indicator indicating second precoding information based on the precoded SRSs,
wherein:
the processor is configured to precode UL data using the indicated second precoding information, and
the transceiver is configured to transmit the uplink (UL) data that is precoded using the indicated second precoding information.

10. The WTRU of claim 9, wherein the transceiver is configured to send an indication to the network entity of a set of recommended precoders.

11. The WTRU of claim 10, wherein the processor is configured to identify via the DCI, a subset of the recommended precoders sent as the indication to the network entity based on the indicator included in the DCI.

12. The WTRU of claim 9, wherein the plurality of SRSs and the UL data are precoded differently.

13. The WTRU of claim 9, wherein the indicator is an index to identify the second precoding information.

14. The WTRU of claim 10, wherein the processor is configured to determine the set of recommended precoders used to precode the plurality of the SRSs based on the measured DL RSs.

15. The WTRU of claim 11, wherein the subset of recommended precoders associated with the second precoding information and indicated by the indicator in the DCI is used to any of generate a beam: (1) in a particular direction; (2) to avoid or to substantially avoid an interference direction; (3) to cancel or reduce interference between or among the WTRU and one or more further WTRUs; or (4) having a null space that corresponds to an interference direction associated with at least one other WTRU.

16. The WTRU of claim 14, wherein the processor is configured to determine a precoding vector or precoding matrix based on channel state information (CSI) RSs, as the measured DL RSs.

17. A Network Access Point (NAP) configured to provide precoding assistance to a Wireless Transmit/Receive Unit (WTRU) using a plurality of Sounding Reference Signals (SRSs), the NAP comprising:

a transceiver configured to receive, from the WTRU, the plurality of SRSs that are precoded; and
a processor configured to:
   determine precoders associated with the precoded SRSs that are recommended by the WTRU,
   select a subset of the recommended precoders, and
   transmit, to the WTRU, Downlink Control Information (DCI) including an indicator indicating the selected subset of recommended precoders,
wherein:
   the transceiver is configured to receive UL data from the WTRU, and
   the processor is configured to decode the UL data using the subset of recommended precoders.

18. The NAP of claim 17, wherein the plurality of SRSs and the UL data are precoded differently.

19. The NAP of claim 17, wherein the indicator is an index to identify the subset of recommended precoders.

20. The NAP of claim 17, wherein the processor is configured to select the subset of recommended precoders indicated by the indicator in the DCI based on generation of a beam: (1) in a particular direction; (2) to avoid or to substantially avoid an interference direction; (3) to cancel or to reduce interference between or among the WTRU and one or more further WTRUs; or (4) having a null space that corresponds to an interference direction associated with at least one other WTRU.

* * * * *